(12) United States Patent
Nakanishi

(10) Patent No.: US 9,411,196 B2
(45) Date of Patent: Aug. 9, 2016

(54) LIQUID CRYSTAL DISPLAY DEVICE

(75) Inventor: Youhei Nakanishi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 196 days.

(21) Appl. No.: 14/237,636

(22) PCT Filed: Aug. 9, 2012

(86) PCT No.: PCT/JP2012/070387
§ 371 (c)(1),
(2), (4) Date: Feb. 7, 2014

(87) PCT Pub. No.: WO2013/022075
PCT Pub. Date: Feb. 14, 2013

(65) Prior Publication Data
US 2014/0176881 A1   Jun. 26, 2014

(30) Foreign Application Priority Data

Aug. 11, 2011  (JP) ................................ 2011-176016

(51) Int. Cl.
*G02F 1/1337*   (2006.01)

(52) U.S. Cl.
CPC .... *G02F 1/133753* (2013.01); *G02F 1/133707* (2013.01)

(58) Field of Classification Search
CPC ..................... G02F 1/133707; G02F 1/133753
See application file for complete search history.

(56) References Cited

U.S. PATENT DOCUMENTS

| | | | |
|---|---|---|---|
| 5,473,455 A | 12/1995 | Koike et al. | |
| 6,661,488 B1 | 12/2003 | Takeda et al. | |
| 7,113,241 B2 | 9/2006 | Hanaoka | |
| 2001/0019390 A1* | 9/2001 | Itoh | G02F 1/133753 |
| | | | 349/130 |

(Continued)

FOREIGN PATENT DOCUMENTS

| | | |
|---|---|---|
| JP | 11-242225 A | 9/1999 |
| JP | 2009-163277 A | 7/2009 |
| WO | 2010/119660 A1 | 10/2010 |

OTHER PUBLICATIONS

English translation of Official Communication issued in corresponding International Application PCT/JP2012/070387, mailed on Feb. 20, 2014.

(Continued)

*Primary Examiner* — Jessica M Merlin
(74) *Attorney, Agent, or Firm* — Keating & Bennett, LLP

(57) ABSTRACT

This liquid crystal display device (100) includes: a vertical alignment liquid crystal layer (3); a pixel electrode (11) and a counter electrode (21) arranged on first and second substrates (1, 2), respectively, to front on the liquid crystal layer; and first and second alignment films (12, 22). Each pixel region (10) includes first, second, third and fourth liquid crystal domains (A, B, C, D) in which liquid crystal molecules (3a) are tilted in first, second, third and fourth predetermined directions, respectively, which are defined so that an angle formed between any two of them is approximately equal to an integral multiple of 90 degrees. The first liquid crystal domain is located close to at least a part of edges of the pixel electrode, which includes a first edge portion (EG1) where an azimuthal direction (e1) perpendicular to the part and pointing toward the inside of the pixel electrode defines an angle greater than 90 degrees to the first direction. The first substrate includes a first rib (14) which is arranged in a region corresponding to the first edge portion and under the pixel electrode.

14 Claims, 16 Drawing Sheets

(56) References Cited

U.S. PATENT DOCUMENTS

2009/0284703 A1* 11/2009 Shoraku ............ G02F 1/133753
    349/129
2010/0157220 A1* 6/2010 Shin ................. G02F 1/133707
    349/123
2012/0033158 A1 2/2012 Nakanishi et al.

OTHER PUBLICATIONS

Official Communication issued in International Patent Application No. PCT/JP2012/070387, mailed on Nov. 6, 2012.

* cited by examiner (a) TFT SUBSTRATE SIDE (b) CF SUBSTRATE SIDE (c) LIQUID CRYSTAL LAYER (a) TFT SUBSTRATE SIDE (b) CF SUBSTRATE SIDE (c) LIQUID CRYSTAL LAYER (a) TFT SUBSTRATE SIDE (b) CF SUBSTRATE SIDE (c) LIQUID CRYSTAL LAYER (a) TFT SUBSTRATE SIDE (b) CF SUBSTRATE SIDE (c) LIQUID CRYSTAL LAYER (a) PRIOR ART (b) EMBODIMENT OF THIS INVENTION

| (a) | (b) |
|---|---|
| EMBODIMENT OF THIS INVENTION THAT USES NO ADDITIONAL RIBS | ANOTHER EMBODIMENT OF THIS INVENTION THAT USES ADDITIONAL RIBS |

LIQUID CRYSTAL DISPLAY DEVICE

TECHNICAL FIELD

The present invention relates to a liquid crystal display device and more particularly relates to a liquid crystal display device including a vertical alignment liquid crystal layer and having a wide viewing angle characteristic.

BACKGROUND ART

Recently, the display performances of liquid crystal display devices have been improved to the point that more and more manufacturers use them in TV receivers, for example. The viewing angle characteristic of liquid crystal display devices has been improved to a certain degree but is not satisfactorily in some respects. Among other things, there is still a high demand for improvement of the viewing angle characteristic of a liquid crystal display device that uses a vertical alignment liquid crystal layer (which is sometimes called a "VA mode liquid crystal display device").

A VA mode liquid crystal display device which is currently used for a TV set with a big screen, for example, adopts an alignment division structure in which multiple liquid crystal domains are formed in a single pixel region to improve the viewing angle characteristic. An MVA (multi-domain vertical alignment) mode is often adopted as a method of forming such an alignment division structure. The MVA mode is disclosed in Patent Document No. 1, for example.

Specifically, according to the MVA mode, an alignment control structure is provided on each of the two substrates, which face each other with a vertical alignment liquid crystal layer interposed between them, so as to contact with the liquid crystal layer, thereby forming multiple domains with mutually different alignment directions (i.e., tilt directions), the number of which is typically four, in each pixel region. As the alignment control structure, a slit (as an opening) provided in an electrode or a rib (as a projection structure) may be used, thereby creating an alignment controlling force from both sides of the liquid crystal layer.

If such a slit or rib is adopted, however, the alignment controlling force will be applied onto liquid crystal molecules non-uniformly within a pixel region because the slit or rib has a linear structure unlike the situation where the pretilt directions are defined by an alignment film in a conventional TN (twisted nematic) mode LCD. As a result, the response speed may have a distribution unintentionally. In addition, since the transmittance of light will decrease in the areas with the slits or ribs, the brightness of the screen will decrease, too.

To avoid such a problem, the alignment division structure is suitably formed by defining the pretilt directions with an alignment film for a VA mode liquid crystal display device, too. However, the present inventor discovered that if such an alignment division structure was provided, alignment disorder specific to a VA mode liquid crystal display device would occur to debase its display quality. Specifically, an area that looks darker than the other areas (i.e., a dark line) would be produced parallel to, and in the vicinity of, an edge of a pixel electrode, thus causing a decrease in transmittance.

A structure for minimizing such a decrease in transmittance is proposed in Patent Document No. 2. In the structure proposed in Patent Document No. 2, in a liquid crystal display device in which an alignment division structure is formed by an alignment film, ribs are provided for its counter substrate (i.e., a substrate that faces an active-matrix substrate with pixel electrodes). Those ribs are arranged in areas corresponding to portions of the edges of the pixel electrodes around which dark lines are produced (which are called "edge portions" in Patent Document No. 2), i.e., arranged to face the edge portions. By providing such ribs, the dark lines can be made thinner and driven out of the pixel regions, and therefore, the decrease in transmittance can be minimized.

CITATION LIST

Patent Literature

Patent Document No. 1: Japanese Laid-Open Patent Publication No. 11-242225
Patent Document No. 2: PCT International Application Publication No. 2010/119660

SUMMARY OF INVENTION

Technical Problem

However, to check the decrease in transmittance sufficiently using the structure proposed in Patent Document No. 2, the edge portions of the pixel electrodes need to be aligned accurately with the ribs. That is why in bonding the active-matrix substrate and the counter substrate together, high alignment accuracy is required. But to ensure such high alignment accuracy in bonding those substrates together, the yield will decrease instead. In addition, to check the decrease in transmittance sufficiently using the structure proposed in Patent Document No. 2, the height and width of the ribs should be controlled accurately, too.

Thus, the present inventor perfected our invention to overcome these problems by preventing the transmittance from decreasing due to generation of such dark lines in a VA mode liquid crystal display device, of which the alignment division structure is formed of an alignment film, substantially without decreasing the production yield.

Solution to Problem

A liquid crystal display device as an embodiment of the present invention includes a plurality of pixel regions which are arranged to form a matrix pattern. The device further includes: a vertical alignment liquid crystal layer; first and second substrates which face each other with the liquid crystal layer interposed between themselves; a pixel electrode which is arranged in each of the pixel regions on one side of the first substrate that fronts on the liquid crystal layer; a counter electrode which is arranged on one side of the second substrate that fronts on the liquid crystal layer and which faces the pixel electrodes; and first and second alignment films which are arranged between the pixel electrodes and the liquid crystal layer and between the counter electrode and the liquid crystal layer, respectively. Each of the plurality of pixel regions includes first, second, third and fourth liquid crystal domains in which liquid crystal molecules are tilted in first, second, third and fourth predetermined directions, respectively, around the center of a plane, and approximately at the middle of the thickness, of the liquid crystal layer in response to a voltage applied between the pixel electrode and the counter electrode. The first, second, third and fourth directions are four directions that are defined so that an angle formed between any two of the four directions is approximately equal to an integral multiple of 90 degrees. The first liquid crystal domain is located close to at least a part of edges of the pixel electrode. The part includes a first edge portion in which an azimuthal direction that is perpendicular to the part and that points toward the inside of the pixel electrode defines an angle greater than 90 degrees with respect to the first direction. And the first substrate includes a first rib which is arranged in a region corresponding to the first edge portion and under the pixel electrode.

In one preferred embodiment, the azimuthal component of an alignment controlling force produced by an oblique electric field that has been generated in the vicinity of the first edge portion and the azimuthal component of an alignment controlling force produced by the first or second alignment film have mutually opposite directions.

In one preferred embodiment, a half or more of the first rib overlaps with the pixel electrode.

In one preferred embodiment, the second liquid crystal domain is located close to at least a part of edges of the pixel electrode, the at least part including a second edge portion in which an azimuthal direction that is perpendicular to the part and that points toward the inside of the pixel electrode defines an angle greater than 90 degrees with respect to the second direction. The third liquid crystal domain is located close to at least a part of edges of the pixel electrode, the at least part including a third edge portion in which an azimuthal direction that is perpendicular to the part and that points toward the inside of the pixel electrode defines an angle greater than 90 degrees with respect to the third direction. The fourth liquid crystal domain is located close to at least a part of edges of the pixel electrode, the at least part including a fourth edge portion in which an azimuthal direction that is perpendicular to the part and that points toward the inside of the pixel electrode defines an angle greater than 90 degrees with respect to the fourth direction. The first substrate further includes: a second rib which is arranged in a region corresponding to the second edge portion and under the pixel electrode; a third rib which is arranged in a region corresponding to the third edge portion and under the pixel electrode; and a fourth rib which is arranged in a region corresponding to the fourth edge portion and under the pixel electrode.

In one preferred embodiment, the first substrate further includes a rib structure which is arranged in a region corresponding to every edge of the pixel electrode and which is arranged under the pixel electrode. The rib structure includes the first, second, third and fourth ribs.

In one preferred embodiment, the first, second, third and fourth liquid crystal domains are arranged in two columns and two rows to form a matrix pattern so that each of these liquid crystal domains is adjacent to the other liquid crystal domains.

In one preferred embodiment, the first, second, third and fourth liquid crystal domains are arranged so that their tilt directions are different from each other by approximately 90 degrees between any two adjacent ones of the liquid crystal domains.

In one preferred embodiment, if a horizontal direction on a display plane has an azimuth angle of 0 degrees, the first direction is about 45 degrees, about 135 degrees, about 225 degrees or about 315 degrees.

In one preferred embodiment, the azimuthal direction that is perpendicular to the first edge portion and that points toward the inside of the pixel electrode defines an angle of approximately 135 degrees with respect to the first direction.

In one preferred embodiment, the liquid crystal display device of the present invention further includes a pair of polarizers which face each other with the liquid crystal layer interposed between themselves and which are arranged so that their transmission axes intersect with each other at substantially right angles. The first, second, third and fourth directions define an angle of approximately 45 degrees with respect to the transmission axes of the pair of polarizers.

In one preferred embodiment, the liquid crystal layer has liquid crystal molecules with negative dielectric anisotropy, and the pretilt directions defined by the first and second alignment films are different from each other by approximately 90 degrees.

In one preferred embodiment, the pretilt angles defined by the first and second alignment films are substantially equal to each other.

In one preferred embodiment, each of the first and second alignment films is a photo-alignment film.

Advantageous Effects of Invention

According to an embodiment of the present invention, it is possible to prevent the transmittance from decreasing due to generation of dark lines in a VA mode liquid crystal display device, of which the alignment division structure is formed of an alignment film, substantially without decreasing the production yield.

DESCRIPTION OF EMBODIMENTS

Figure 1:
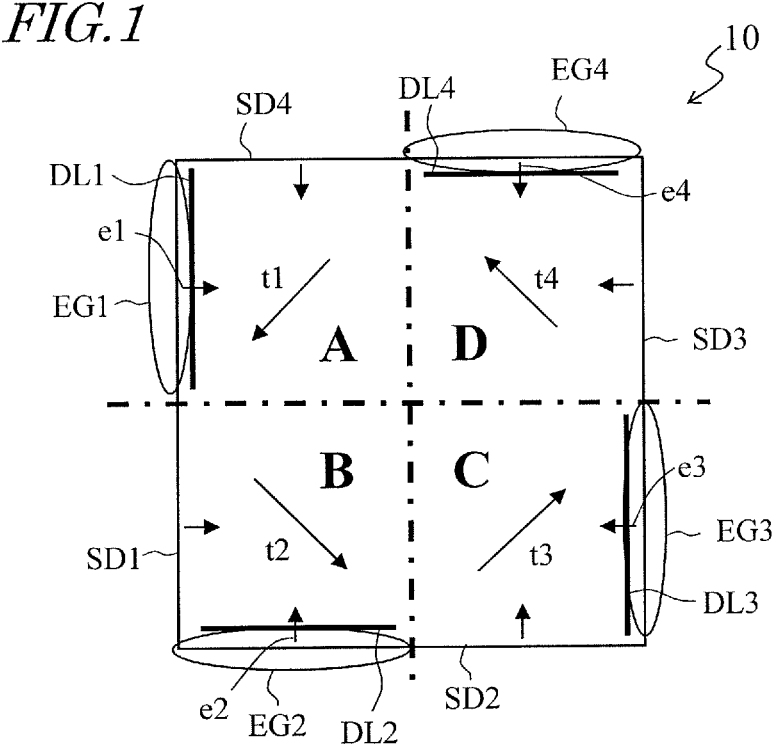
FIG. 1 Illustrates an exemplary pixel region with an alignment division structure for a VA mode liquid crystal display device.

Hereinafter, embodiments of the present invention will be described with reference to the accompanying drawings. It should be noted that the present invention is in no way limited to the embodiments to be described below.

First of all, some major terms to be used in this description will be described.

In this description, the "vertical alignment liquid crystal layer" means a liquid crystal layer in which liquid crystal molecules defines a tilt angle of approximately 85 degrees or more with respect to the surface of a vertical alignment film. The liquid crystal molecules included in the vertical alignment liquid crystal layer have negative dielectric anisotropy. By combining the vertical alignment liquid crystal layer with a pair of polarizers that are arranged as crossed Nicols so as to face each other with the liquid crystal layer interposed between them (i.e., arranged so that their transmission axes intersect with each other at substantially right angles), a display operation is conducted in normally black mode.

In this description, a "pixel" refers to a minimum unit representing a particular gray scale tone on the display screen, and corresponds to a unit representing each gray scale tone of R, G and B in color display and is also called a "dot". A combination of R, G and B pixels forms a single color display pixel. A "pixel region" refers herein to a region of a liquid crystal display device which is allocated to a single "pixel" on the display screen.

A "pretilt direction" is the orientation direction of liquid crystal molecules to be controlled with an alignment film and refers herein to an azimuthal direction on a display screen. Also, the angle formed by liquid crystal molecules with respect to the surface of the alignment film in this case will be referred to herein as a "pretilt angle". Also, to carry out such a treatment as to bring out the ability to define the pretilt direction in a predetermined direction on an alignment film will be referred to herein as "giving a pretilt direction to the alignment film". Furthermore, the pretilt direction defined by an alignment film will be sometimes simply referred to herein as the "alignment film's pretilt direction". A pretilt direction is given to an alignment film by subjecting the alignment film to the rubbing treatment or photo-alignment treatment to be described later, for example.

By changing combinations of the pretilt directions of the two alignment films that face each other with the liquid crystal layer interposed between them, a quadruple (four-domain) structure can be formed. The pixel region that has been divided into four has four liquid crystal domains.

Each of these liquid crystal domains is characterized by the tilt direction of liquid crystal molecules at the center of a plane of the liquid crystal layer, to which a voltage is being applied, and at the middle of the thickness of the liquid crystal layer. Such a tilt direction will be sometimes referred to herein as a "reference alignment direction". And this tilt direction (or reference alignment direction) will have a decisive effect on the viewing angle dependence of each domain. This tilt direction is also an azimuthal direction. The reference azimuthal direction is supposed to be the horizontal direction on the display screen and the azimuth angle is supposed to increase counterclockwise. For example, comparing the display screen to a clock face, the three o'clock direction is supposed to have an azimuth angle of zero degrees and the angle is supposed to increase counterclockwise. By defining four directions so that an angle formed between any two of the four directions is approximately equal to an integral multiple of 90 degrees (e.g., as the twelve o'clock direction, the nine o'clock direction, the six o'clock direction and the three o'clock direction, respectively), highly uniform viewing angle characteristic and good display quality are realized. To increase the uniformity of the viewing angle characteristic, the areas of those four liquid crystal domains in each pixel region are suitably substantially equal to each other. Specifically, the difference in area between the largest and smallest ones of the four liquid crystal domains is suitably equal to or smaller than 25% of the largest area.

The vertical alignment liquid crystal layer of the embodiment to be described below includes liquid crystal molecules with negative dielectric anisotropy (i.e., a nematic liquid crystal material with negative dielectric anisotropy). The pretilt direction defined by one of the two alignment films is different by approximately 90 degrees from the one defined by the other. The tilt direction (i.e., the reference alignment direction) is defined as an intermediate direction between these two pretilt directions. No chiral agent is added to the liquid crystal layer. And when a voltage is applied to the liquid crystal layer, the liquid crystal molecules located near the alignment films will have a twisted alignment under the alignment controlling force of the alignment films. If necessary, a chiral agent may be added to the liquid crystal layer. By using such a pair of vertical alignment films defining two pretilt directions (alignment treatment directions) that are perpendicular to each other, the VA mode in which the liquid crystal molecules have a twisted alignment is sometimes called a vertical alignment twisted nematic (VATN) mode.

In the VATN mode, the pretilt angles defined by the two alignment films are suitably substantially equal to each other. If the pretilt angles are approximately equal to each other, the display luminance characteristic can be improved, which is advantageous. Particularly when the difference between the pretilt angles is within one degree, the tilt direction (i.e., the reference alignment direction) of liquid crystal molecules, located approximately at the middle of the thickness of the liquid crystal layer, can be controlled with good stability and the display luminance characteristic can be improved. This is probably because if the difference between the pretilt angles were more than one degree, then the tilt direction would be significantly different from the predetermined one and some area would have a lower transmittance than an intended one.

According to known methods, a pretilt direction may be given to an alignment film by subjecting the alignment film to a rubbing treatment or a photo-alignment treatment, by forming a microstructure on an undercoat film for each alignment film and transferring the pattern of the microstructure onto the surface of the alignment film, or by evaporating obliquely an inorganic material such as SiO on an alignment film to define a microstructure thereon. Considering its mass productivity, either the rubbing treatment or the photo-alignment treatment is preferred. Among other things, the photo-alignment treatment is particularly preferred to increase the yield because that treatment is a non-contact method and generates no static electricity due to friction unlike the rubbing treatment. Also, by using a photo-alignment film including a photosensitive group, the variation in pretilt angle can be reduced to one degree or less. The photo-alignment film suitably includes at least one photosensitive group selected from the group consisting of a 4-chalcone group, a 4'-chalcone group, a coumarin group, and a cinnamoyl group.

Next, it will be described why a dark line is produced in the vicinity of an edge portion of an electrode.

When a voltage is applied to a liquid crystal display device including a vertical alignment liquid crystal layer, of which the pretilt direction is controlled using an alignment film, to display a gray scale tone thereon, an area which looked darker than the gray scale tone to be displayed when viewed straight may appear inside of, and substantially parallel to, an edge of a pixel electrode. In an alignment division structure, if at any of the edges of a pixel electrode, to which a liquid crystal domain is located close (such a portion will be referred to herein as an "edge portion"), the azimuthal direction that is perpendicular to the edge portion and that points toward the inside of the pixel electrode defines an angle greater than 90 degrees with respect to the tilt direction (i.e., the reference alignment direction) of the liquid crystal domain, such a dark line will appear inside of, and substantially parallel to, that edge portion. The alignment state of the liquid crystal molecules will be disturbed in that area, probably because the tilt direction of the liquid crystal domain and the direction in which the alignment controlling force is produced by an oblique electric field at the edge of the pixel electrode have opposing components.

The quadruple pixel region 10 shown in FIG. 1 will be described. FIG. 1 illustrates a substantially square pixel region 10 provided for a substantially square pixel electrode for the sake of simplicity. However, the present invention is in no way limited to any particular shape of a pixel region. For example, the pixel region 10 may also have a substantially rectangular shape.

The pixel region 10 includes four liquid crystal domains A, B, C and D, of which the tilt directions (i.e., reference alignment directions) are identified by t1, t2, t3 and t4, respectively. These four tilt directions are defined so that an angle formed between any two of the four directions is approximately equal to an integral multiple of 90 degrees. What is illustrated in FIG. 1 is an ideal quadruple structure to achieve the best viewing angle characteristic, because the areas of these liquid crystal domains A, B, C and D are equal to each other. The four liquid crystal domains A, B, C and D are arranged in two columns and two rows to define a matrix pattern.

This pixel electrode has four edges (or sides) SD1, SD2, SD3 and SD4. An oblique electric field to be generated responsive to a voltage applied produces an alignment controlling force that has a component that is perpendicular to any of these sides and that points toward the inside of the pixel electrode (in an azimuthal direction). In the example shown in FIG. 1, the azimuthal directions that are perpendicular to the four edges SD1, SD2, SD3 and SD4 and that point toward the inside of the pixel electrode are identified by the arrows e1, e2, e3 and e4, respectively.

Each of the four liquid crystal domains A, B, C and D is close to two out of the four edges SD1, SD2, SD3 and SD4 of the pixel electrode. While a voltage is being applied thereto, each liquid crystal domain A, B, C or D is subjected to the alignment controlling forces that have been produced at those edges by the oblique electric field.

In an edge portion EG1 of the edges of the pixel electrode, to which the liquid crystal domain A is located close, the azimuthal direction e1 that is perpendicular to the edge portion EG1 and that points toward the inside of the pixel electrode defines an angle greater than 90 degrees with respect to the tilt direction t1 of the liquid crystal domain A, and alignment disorder occurs in that area. As a result, when a voltage is applied thereto, the liquid crystal domain A produces a dark line DL1 parallel to this edge portion EG1. It should be noted that in this case, the two polarizers are arranged so as to face each other with the liquid crystal layer interposed between them and to have their transmission axes (polarization axes) crossed at right angles. More specifically, one of the two transmission axes is arranged parallel to the horizontal direction on the display screen and the other transmission axis is arranged parallel to the vertical direction on the display screen. The transmission axes of the polarizers are supposed to be arranged in this manner unless otherwise stated.

In the same way, in an edge portion EG2 of the edges of the pixel electrode, to which the liquid crystal domain B is located close, the azimuthal direction e2 that is perpendicular to the edge portion EG2 and that points toward the inside of the pixel electrode defines an angle greater than 90 degrees with respect to the tilt direction t2 of the liquid crystal domain B, and alignment disorder occurs in that area. As a result, when a voltage is applied thereto, the liquid crystal domain B produces a dark line DL2 parallel to this edge portion EG2.

In the same way, in an edge portion EG3 of the edges of the pixel electrode, to which the liquid crystal domain C is located close, the azimuthal direction e3 that is perpendicular to the edge portion EG3 and that points toward the inside of the pixel electrode defines an angle greater than 90 degrees with respect to the tilt direction t3 of the liquid crystal domain C, and alignment disorder occurs in that area. As a result, when a voltage is applied thereto, the liquid crystal domain C produces a dark line DL3 parallel to this edge portion EG3.

In the same way, in an edge portion EG4 of the edges of the pixel electrode, to which the liquid crystal domain D is located close, the azimuthal direction e4 that is perpendicular to the edge portion EG4 and that points toward the inside of the pixel electrode defines an angle greater than 90 degrees with respect to the tilt direction t4 of the liquid crystal domain D, and alignment disorder occurs in that area. As a result, when a voltage is applied thereto, the liquid crystal domain D produces a dark line DL4 parallel to this edge portion EG4.

If the horizontal direction on the display screen (i.e., the three o'clock direction) has an azimuthal angle of zero degrees, the tilt directions t1, t2, t3 and t4 are an approximately 225 degree direction (liquid crystal domain A), an approximately 315 degree direction (liquid crystal domain B), an approximately 45 degree direction (liquid crystal domain C) and an approximately 135 degree direction (liquid crystal domain D), respectively. That is to say, these liquid crystal domains A, B, C and D are arranged so that the tilt directions of any two adjacent ones of the liquid crystal domains define an angle of approximately 90 degrees between them. The angle defined by any of the tilt directions t1, t2, t3 and t4 of the liquid crystal domains A, B, C and D with respect to an associated one of the azimuthal components e1, e2, e3 and e4 of the alignment controlling forces produced by the oblique electric fields at the nearby edge portions EG1, EG2, EG3 and EG4 is approximately 135 degrees.

Figure 2:
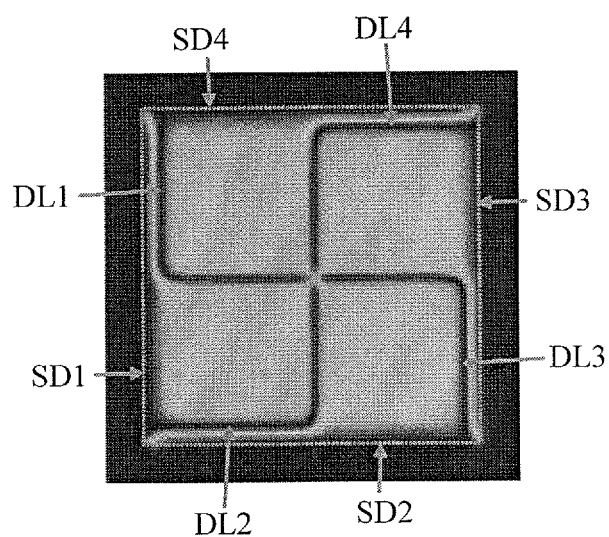
FIG. 2 Shows a simulation result of the transmittance of the pixel region shown in FIG. 1 in a voltage applied state.

The dark lines DL1, DL2, DL3 and DL4 that are produced in this manner parallel to the edge portions EG1, EG2, EG3 and EG4, respectively, within the pixel region 10 will cause a decrease in transmittance. FIG. 2 shows a simulation result of the transmittance of the pixel region 10 in a voltage applied state. It can be seen from FIG. 2 that those dark lines DL1, DL2, DL3 and DL4 were produced in the liquid crystal domains A, B, C and D to cause a decrease in transmittance.

Hereinafter, an alignment division method will be described with reference to FIG. 3. FIGS. 3(a), 3(b) and 3(c) show a method of dividing the pixel region 10 shown in FIG. 1. FIG. 3(a) shows the pretilt directions PA1 and PA2 defined by the alignment film provided for a TFT substrate (as the lower substrate). FIG. 3(b) shows the pretilt directions PB1 and PB2 defined by the alignment film provided for a color filter (CF) substrate (as the upper substrate). And FIG. 3(c) shows the tilt directions and dark lines DL1 through DL4 produced when a voltage is applied to the liquid crystal layer. These drawings schematically indicate the orientation directions of liquid crystal molecules as viewed from the viewer and show that the liquid crystal molecules are tilted so that the elliptical end of each circular cylindrical liquid crystal molecule points toward the viewer.

As shown in FIG. 3(a), the alignment treatment is conducted so as to horizontally divide the region close to the TFT substrate (i.e., a region corresponding to a single pixel region 10) into two and to give pretilt directions PA1 and PA2 which are antiparallel to the vertical alignment film to those left and right regions, respectively. In this embodiment, a photo-alignment treatment is carried out by irradiating the liquid crystal layer with an ultraviolet ray obliquely that has come from the direction pointed by the arrows.

As shown in FIG. 3(b), the alignment treatment is also conducted so as to vertically divide the region close to the CF substrate (i.e., a region corresponding to a single pixel region 10) into two and to give pretilt directions PB1 and PB2 which are antiparallel to the vertical alignment film to those upper and lower regions, respectively. In this embodiment, a photo-alignment treatment is carried out by irradiating the liquid crystal layer with an ultraviolet ray obliquely that has come from the direction pointed by the arrows.

By bonding together the TFT and CF substrates that have been subjected to the alignment treatment as shown in FIGS. 3(a) and 3(b), an alignment divided pixel region 10 can be defined as shown in FIG. 3(c). As can be seen from FIG. 3(c), in each of the liquid crystal domains A through D, the respective pretilt directions of the alignment films on the TFT and CF substrates are different from each other by approximately 90 degrees, and a tilt direction (reference alignment direction) is defined as an intermediate direction between these two pretilt directions.

As already described with reference to FIG. 1, the dark lines DL1, DL2, DL3 and DL4 are produced in the liquid crystal domains A, B, C and D parallel to the edge portions EG1, EG2, EG3 and EG4, respectively. The dark lines DL1 and DL3 are substantially parallel to the vertical direction on the display screen, while the dark lines DL2 and DL4 are substantially parallel to the horizontal direction on the display screen. That is to say, the edge portions EG1 and EG3 are substantially parallel to the vertical direction, and the edge portions EG2 and EG4 are substantially parallel to the horizontal direction.

Figure 3:
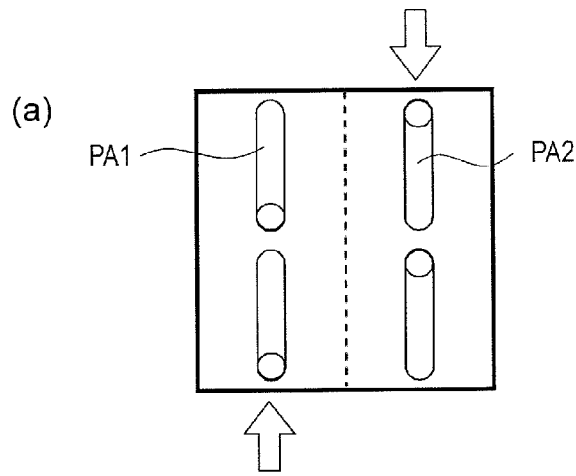
FIG. 3 Illustrates a method for dividing the pixel region shown in FIG. 1, wherein (a) and (b) show the pretilt directions on TFT and CF substrate, respectively, and (c) shows tilt directions and dark lines to be obtained when a voltage is applied to the liquid crystal layer.
Figure 3:
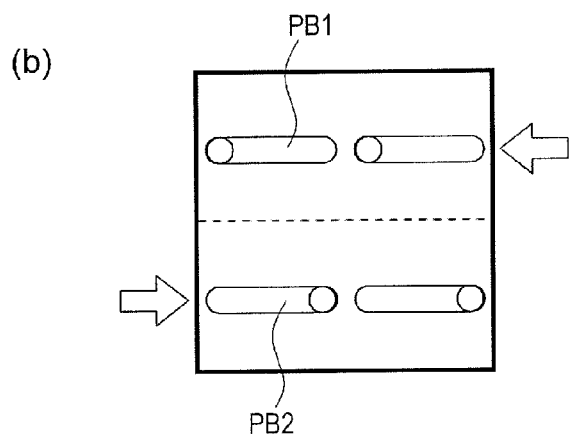
Figure 3:
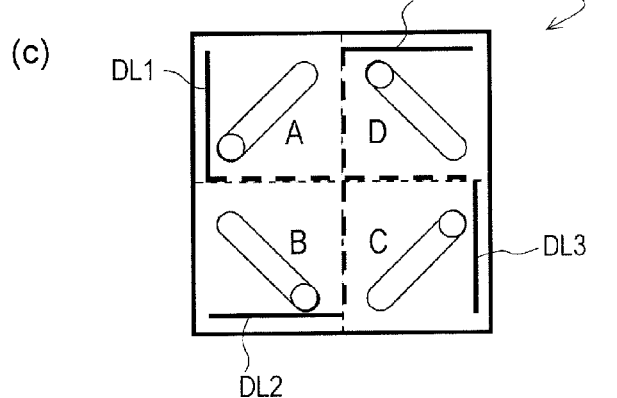

It should be noted that the alignment division method for dividing a single pixel region into four liquid crystal domains A through D (i.e., the arrangement of the liquid crystal domains A through D in the pixel region) shown in FIG. 3 is only an example and does not have to be adopted.

Figure 4:
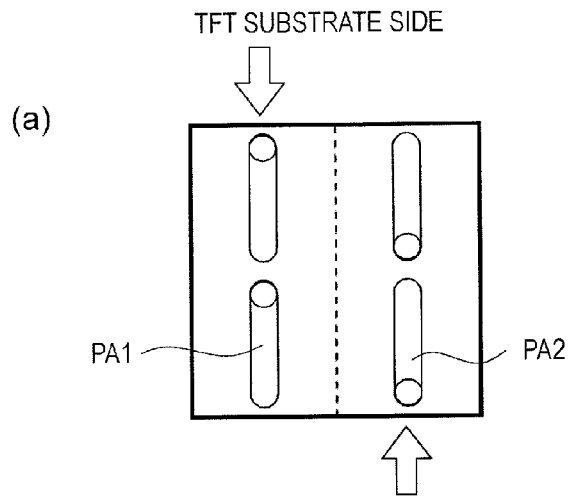
FIG. 4 Illustrates another method for dividing the pixel region, wherein (a) and (b) show the pretilt directions on TFT and CF substrate, respectively, and (c) shows tilt directions and dark lines to be obtained when a voltage is applied to the liquid crystal layer.
Figure 4:
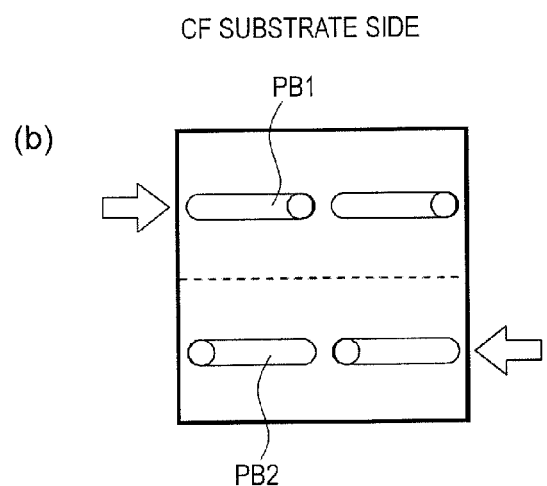
Figure 4:
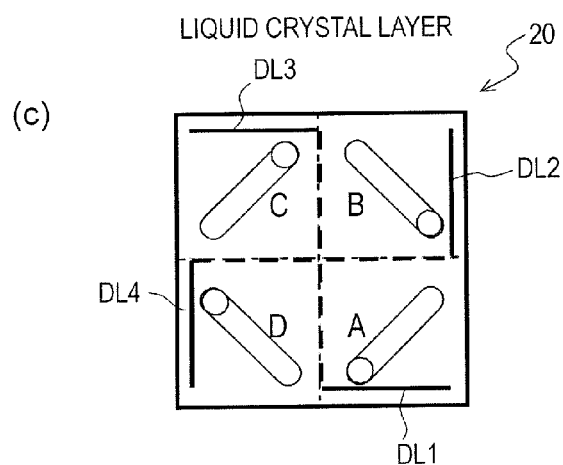

For example, by bonding together the TFT and CF substrates that have been subjected to the alignment treatment as shown in FIGS. 4(a) and 4(b), an alignment divided pixel region 20 can be defined as shown in FIG. 4(c). Just like the pixel region 10, this pixel region 20 also includes four liquid crystal domains A, B, C and D. The tilt directions of the liquid crystal domains A through D are the same as those of the liquid crystal domains A through D of the pixel region 10.

Nevertheless, even though the liquid crystal domains A through D of the pixel region 10 are respectively arranged as its upper left, lower left, lower right and upper right parts (i.e., arranged counterclockwise from the upper left part), the liquid crystal domains A through D of the pixel region 20 are respectively arranged as its lower right, upper right, upper left and lower left parts (i.e., arranged counterclockwise from the lower right part). The reason is that the pretilt directions of the pixel regions 10 and 20 are opposite to each other in each of the left and right regions of the TFT substrate and in each of the upper and lower regions of the CF substrate. Also, the dark lines DL1 and DL3 produced in the liquid crystal domains A and C are substantially parallel to the horizontal direction on the display screen, and the dark lines DL2 and DL4 produced in the liquid crystal domains B and D are substantially parallel to the vertical direction on the display screen. That is to say, the edge portions EG1 and EG3 are substantially parallel to the horizontal direction, and the edge portions EG2 and EG4 are substantially parallel to the vertical direction.

Figure 5:
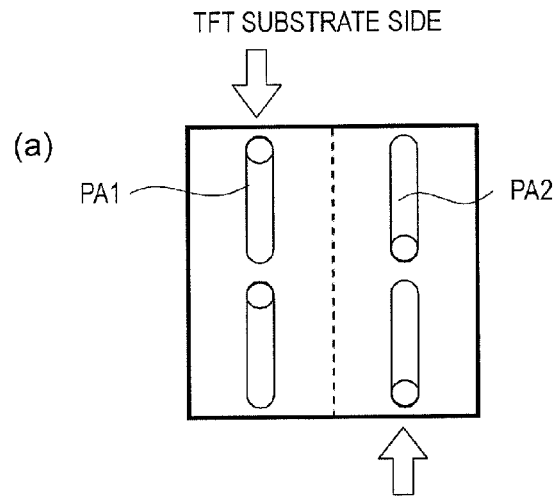
FIG. 5 Illustrates still another method for dividing the pixel region, wherein (a) and (b) show the pretilt directions on TFT and CF substrate, respectively, and (c) shows tilt directions and dark lines to be obtained when a voltage is applied to the liquid crystal layer.
Figure 5:
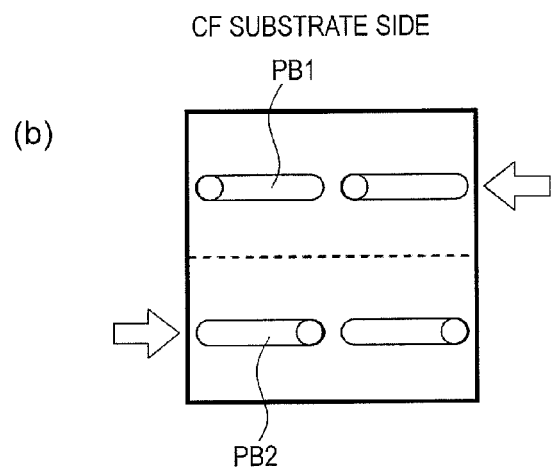
Figure 5:
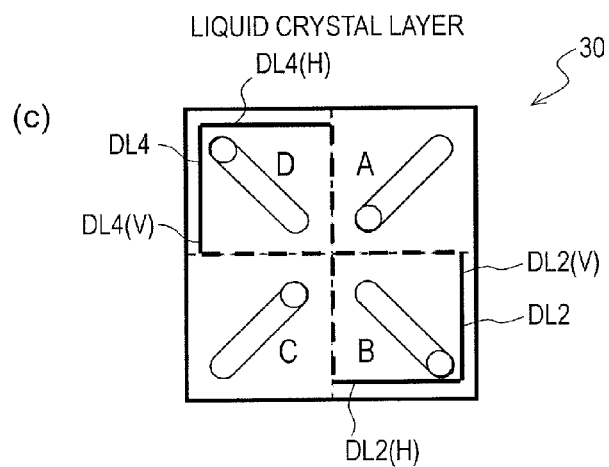

Alternatively, by bonding together the TFT and CF substrates that have been subjected to the alignment treatment as shown in FIGS. 5(a) and 5(b), an alignment divided pixel region 30 can be defined as shown in FIG. 5(c). Just like the pixel region 10, this pixel region 30 also includes four liquid crystal domains A, B, C and D. The tilt directions of the liquid crystal domains A through D are the same as those of the liquid crystal domains A through D of the pixel region 10.

Nevertheless, the liquid crystal domains A through D of the pixel region 30 are respectively arranged as its upper right, lower right, lower left and upper left parts (i.e., arranged clockwise from the upper right part). The reason is that the pretilt directions of the pixel regions 10 and 30 are opposite to each other in each of the left and right regions of the TFT substrate.

Also, in the pixel region 30, no dark lines are produced in the liquid crystal domains A and C, because the edges of the pixel electrode which are close to the liquid crystal domains A and C have no edge portions where azimuthal directions that are perpendicular to the edge portions and that point toward the inside of the pixel electrode define an angle greater than 90 degrees with respect to the tilt direction. On the other hand, dark lines DL2 and DL4 are produced in the liquid crystal domains B and D, because the edges of the pixel electrode which are close to the liquid crystal domains B and D have edge portions where azimuthal directions that are perpendicular to the edge portions and that point toward the inside of the pixel electrode define an angle greater than 90 degrees with respect to the tilt direction. Also, each of the dark lines DL2 and DL4 includes a portion DL2(H), DL4(H) that is parallel to the horizontal direction and a portion DL2(V), DL4(V) that is parallel to the vertical direction. The reason is that in each of the liquid crystal domains B and D, the tilt direction defines an angle greater than 90 degrees with respect to the azimuthal direction that is perpendicular to the edge portion and that points toward the inside of the pixel electrode in both of the horizontal and vertical edge portions.

Figure 6:
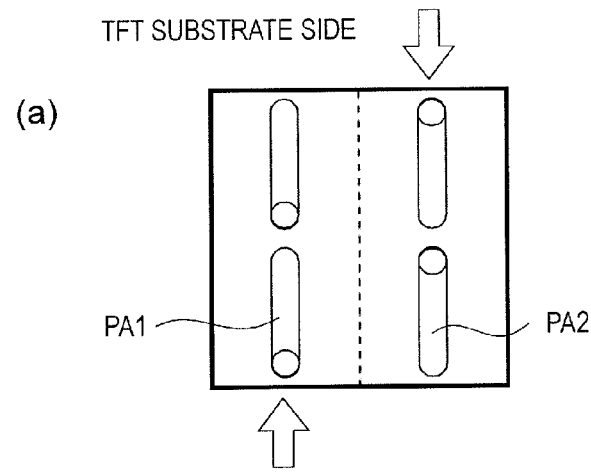
FIG. 6 Illustrates yet another method for dividing the pixel region, wherein (a) and (b) show the pretilt directions on TFT and CF substrate, respectively, and (c) shows tilt directions and dark lines to be obtained when a voltage is applied to the liquid crystal layer.
Figure 6:
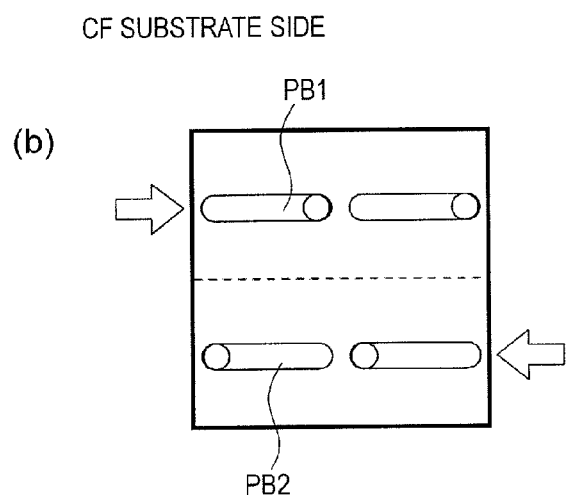
Figure 6:
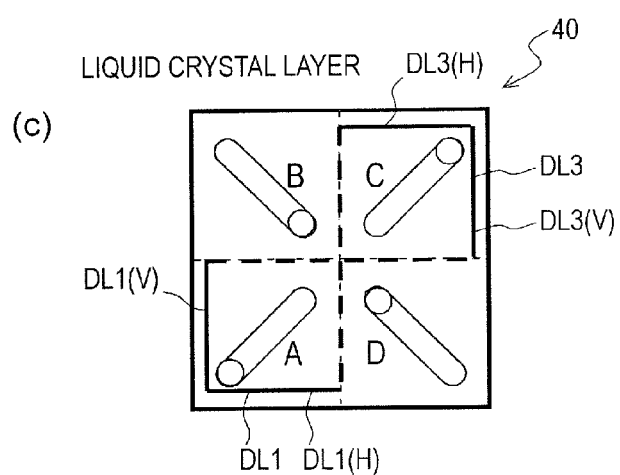

Alternatively, by bonding together the TFT and CF substrates that have been subjected to the alignment treatment as shown in FIGS. 6(a) and 6(b), an alignment divided pixel region 40 can be defined as shown in FIG. 6(c). Just like the pixel region 10, this pixel region 40 also includes four liquid crystal domains A, B, C and D. The tilt directions of the liquid crystal domains A through D are the same as those of the liquid crystal domains A through D of the pixel region 10.

Nevertheless, the liquid crystal domains A through D of the pixel region 40 are respectively arranged as its lower left, upper left, upper right, and lower right parts (i.e., arranged clockwise from the lower left part). The reason is that the pretilt directions of the pixel regions 10 and 40 are opposite to each other in each of the upper and lower regions of the CF substrate.

Also, in the pixel region 40, no dark lines are produced in the liquid crystal domains B and D, because the edges of the pixel electrode which are close to the liquid crystal domains B and D have no edge portions where azimuthal directions that are perpendicular to the edge portions and that point toward the inside of the pixel electrode define an angle greater than 90 degrees with respect to the tilt direction. On the other hand, dark lines DL1 and DL3 are produced in the liquid crystal domains A and C, because the edges of the pixel electrode which are close to the liquid crystal domains A and C have edge portions where azimuthal directions that are perpendicular to the edge portions and that point toward the inside of the pixel electrode define an angle greater than 90 degrees with respect to the tilt direction. Also, each of the dark lines DL1 and DL3 includes a portion DL1(H), DL3(H) that is parallel to the horizontal direction and a portion DL1(V), DL3(V) that is parallel to the vertical direction. The reason is that in each of the liquid crystal domains A and C, the tilt direction defines an angle greater than 90 degrees with respect to the azimuthal direction that is perpendicular to the edge portion and that points toward the inside of the pixel electrode in both of the horizontal and vertical edge portions.

Figure 7:
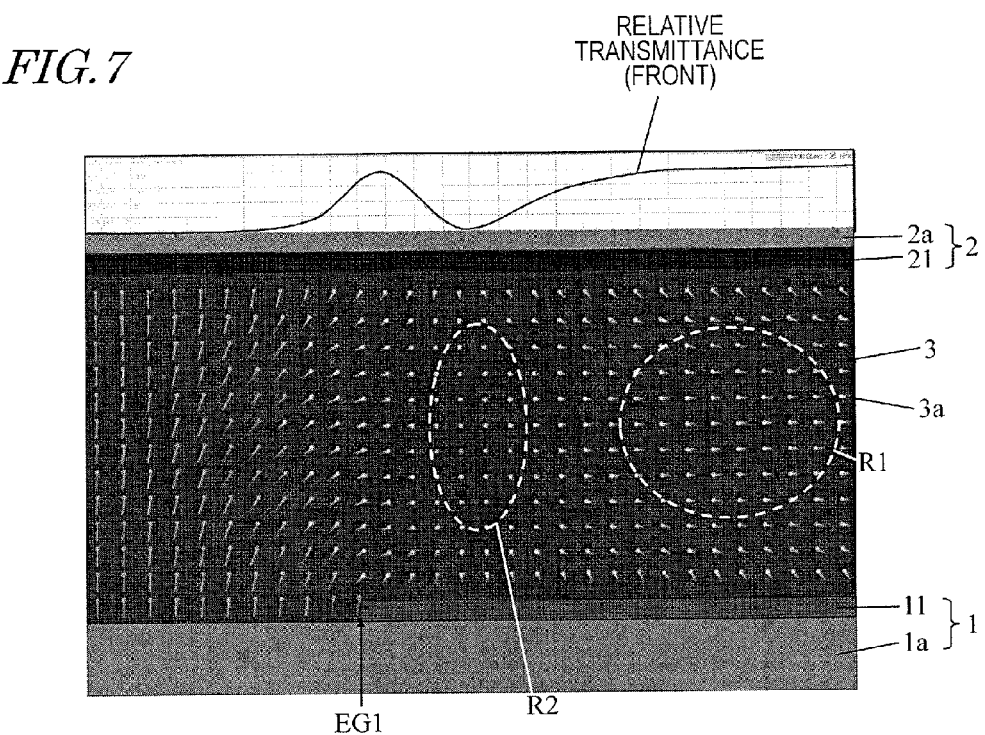
FIG. 7 A cross-sectional view illustrating a portion of a pixel region of a VA mode liquid crystal display device and showing the orientation directions of liquid crystal molecules and the relative (front) transmittance which were obtained by simulations.

FIG. 7 is a cross-sectional view illustrating a portion of a pixel region and showing the orientation directions of liquid crystal molecules and the relative (front) transmittance which were obtained by simulations. In FIG. 7, illustrated as components of this liquid crystal display device are a TFT substrate 1 including a transparent substrate (e.g., a glass substrate) 1a and a pixel electrode 11 on the transparent substrate 1a, a CF substrate 2 including a transparent substrate (e.g., a glass substrate) 2a and a counter electrode 12 on the transparent substrate 2a, a vertical alignment tilt liquid crystal layer 3 interposed between the TFT and CF substrates 1 and 2, and liquid crystal molecules 3a included in the liquid crystal layer 3.

FIG. 7 is a cross-sectional view of the left half of the liquid crystal domain A shown in FIG. 3(c) as viewed on a plane defined by an azimuth angle of zero degrees. Two vertical alignment films (not shown) are provided on the respective surfaces of the TFT and CF substrates 1 and 2 on their side facing the liquid crystal layer 3, and have been subjected to the alignment treatment as shown in FIGS. 3(a) and 3(b). That is why as illustrated in the dotted circle region R1 shown in FIG. 7, the liquid crystal molecules 3a which are located around the center of the plane of the liquid crystal layer and at around the middle of the thickness of the liquid crystal layer in the liquid crystal domain A will fall so that their lower end faces obliquely rightward in the direction going into the paper and their upper end faces obliquely leftward in the direction coming out of the paper. And their tilt direction is a direction defined by an azimuth angle of approximately 225 degrees.

It can be seen that in the edge portion EG1 of the pixel electrode 11 shown in FIG. 7, liquid crystal molecules 3a, which should tilt in a 135 degree direction, are gradually twisted toward the edge portion EG1 of the pixel electrode 11 under the alignment controlling force (which acts so as to make the liquid crystal molecules 3a fall in an azimuthal direction of zero degrees) of an oblique electric field generated in the edge portion EG1 of the pixel electrode 11. In this example, the twist angle is 135 degrees, which is greater than 90 degrees. That is why due to a variation in retardation in this twisting region of the liquid crystal layer 3, the relative transmittance varies in a complicated manner as shown in FIG. 7, thereby producing a region in which the relative transmittance becomes local minimum within the pixel region 10 (i.e., inside of the edge of the pixel electrode 11). That region as indicated by the dotted ellipse in FIG. 7 corresponds to the dark line DL1 in the liquid crystal domain A shown in FIG. 3(c).

Figure 8:
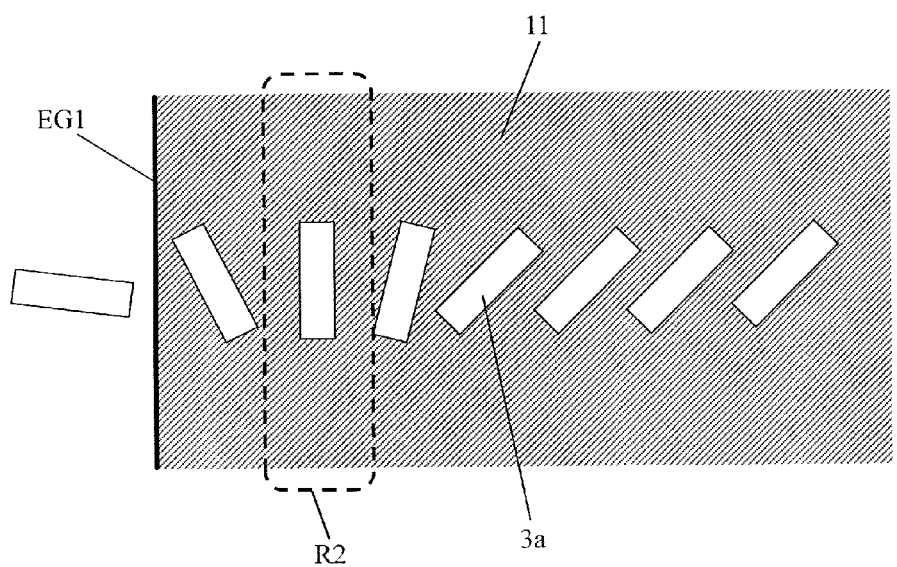
FIG. 8 A top view showing the region illustrated in FIG. 7 and schematically showing the orientations of liquid crystal molecules approximately at the middle of the thickness of the liquid crystal layer.

FIG. 8 is a top view of the region illustrated in FIG. 7, and schematically shows the orientations of liquid crystal molecules 3a approximately at the middle of the thickness of the liquid crystal layer 3. As can be seen from FIG. 8, at around the center of the liquid crystal domain A, the liquid crystal molecules 3a fall in an intended tilt direction (i.e., in an approximately 135 degree direction). On the other hand, over the edge portion EG1 of the pixel electrode 11, the liquid crystal molecules 3a fall so as to be substantially perpendicular to the edge portion EG1 and point toward the center of the pixel region 10, i.e., in an approximately 0 degree direction, under the alignment controlling force of an oblique electric field. As a result, the liquid crystal molecules 3a located in an intermediate region between them fall so that the orientation directions of the liquid crystal molecules 3a change continuously between the region around the center of the liquid crystal domain A and the region over the edge portion EG1 of the pixel electrode 11. Consequently, as shown in FIG. 8, there are some liquid crystal molecules 3a which fall in an approximately 270 degree direction (i.e., in the direction coming out of the paper on which FIG. 7 is drawn) inside of the edge portion EG1. Since the orientation directions of those liquid crystal molecules 3a are either parallel or perpendicular to the transmission axes of the pair of polarizers, the region in which the liquid crystal molecules 3a have such orientations (i.e., the region R2 surrounded with the dotted rectangle in FIG. 8) will cause almost no retardations to the light passing through the liquid crystal layer 3, i.e., becomes a dark line DL1.

In the foregoing description, the dark lines are supposed to be produced under the condition that an azimuthal direction which is perpendicular to an edge portion of a pixel electrode and which points toward the inside of the pixel electrode defines an angle greater than 90 degrees with respect to the tilt direction (reference alignment direction) of a liquid crystal domain. Speaking more strictly, however, the condition for producing the dark lines should be classified into the following two types. That is to say, there are two types of dark lines which are produced under mutually different conditions. The "first type" of dark lines are produced in the vicinity of an edge portion where the azimuthal component of the alignment controlling force caused by an oblique electric field and the azimuthal component of the alignment controlling force caused by the alignment film of the CF substrate are in mutually opposite directions. On the other hand, the "second type" of dark lines are produced in the vicinity of an edge portion where the azimuthal component of the alignment controlling force caused by an oblique electric field and the azimuthal component of the alignment controlling force caused by the alignment film of the TFT substrate are in mutually opposite directions.

For example, in the pixel region 10 shown in FIG. 3(c), the dark lines DL1 and DL3 are the first type of dark lines and the dark lines DL2 and DL4 are the second type of dark lines. On the other hand, in the pixel region 20 shown in FIG. 4(c), the dark lines DL2 and DL4 are the first type of dark lines and the dark lines DL1 and DL3 are the second type of dark lines. Furthermore, in the pixel region 30 shown in FIG. 5(c), the portions DL2(V) and DL4(V) of the dark lines DL2 and DL4 which are parallel to the vertical direction are the first type of dark lines and the portions DL2(H) and DL4(H) of the dark lines DL2 and DL4 which are parallel to the horizontal direction are the second type of dark lines. Furthermore, in the pixel region 40 shown in FIG. 6(c), the portions DL1(V) and DL3(V) of the dark lines DL1 and DL3 which are parallel to the vertical direction are the first type of dark lines and the portions DL1(H) and DL3(H) of the dark lines DL1 and DL3 which are parallel to the horizontal direction are the second type of dark lines.

Figure 9:
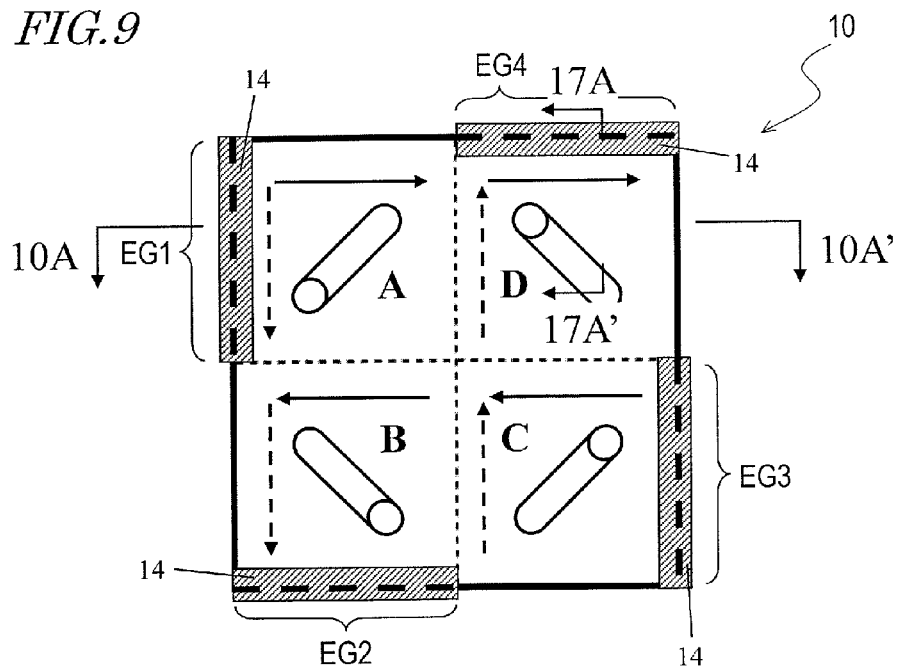
FIG. 9 A plan view schematically illustrating a single pixel region of a liquid crystal display device 100 as a preferred embodiment of the present invention.
Figure 10:
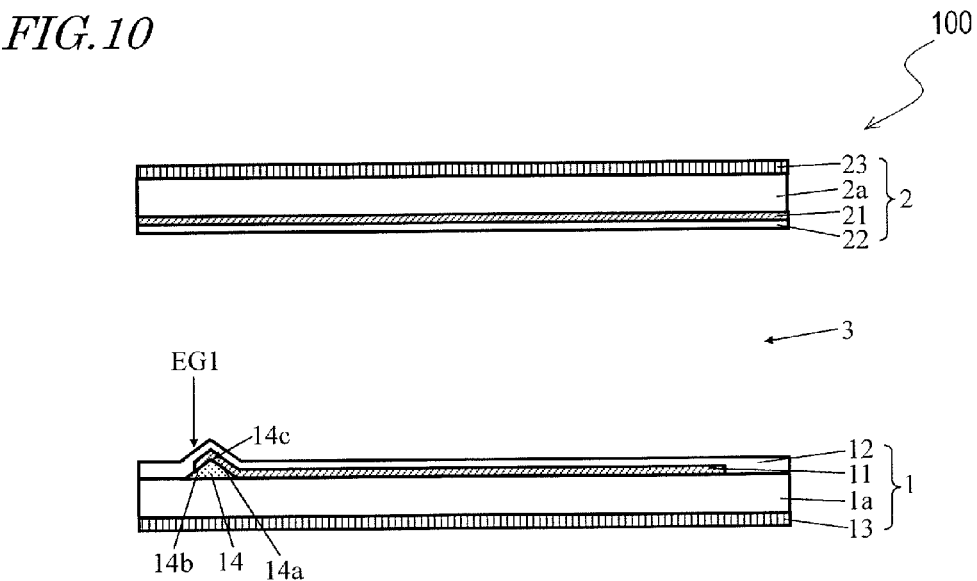
FIG. 10 A cross-sectional view schematically illustrating the liquid crystal display device 100 according to the preferred embodiment of the present invention as viewed on the plane 10A-10A' shown in FIG. 9.

Hereinafter, the specific structure of the liquid crystal display device 100 of this embodiment will be described with reference to FIGS. 9 and 10. FIG. 9 is a plan view schematically illustrating a single pixel region 10 of the liquid crystal display device 100. FIG. 10 is a cross-sectional view of the device as viewed on the plane 10A-10A' shown in FIG. 9.

As shown in FIG. 10, this liquid crystal display device 100 includes a vertical alignment liquid crystal layer 3, a TFT substrate 1 (which will be sometimes referred to herein as an "active-matrix substrate") and a CF substrate 2 (which will be sometimes referred to herein as a "counter substrate") that face each other with the liquid crystal layer interposed between them, pixel electrodes 11 which are arranged on one side of the TFT substrate 1 that fronts on the liquid crystal layer 3, and a counter electrode 21 which is arranged on one side of the CF substrate 2 that fronts on the liquid crystal layer 3.

The liquid crystal layer 3 includes liquid crystal molecules with negative dielectric anisotropy. The pixel electrodes 11 are provided on a transparent substrate (such as a glass substrate) 1a for respective pixel regions 10. And the counter electrode 21 is arranged on a transparent substrate (such as a glass substrate) 2a so as to face the pixel electrodes 11.

A first alignment film 12 is arranged between the pixel electrodes 11 and the liquid crystal layer 3. A second alignment film 22 is arranged between the counter electrode 21 and the liquid crystal layer 3. Two polarizers 13 and 23 are arranged so as to face each other with the liquid crystal layer 3 interposed between them. Also, these polarizers 13 and 23 are arranged so that their transmission axes (polarization axes) cross each other at substantially right angles.

This liquid crystal display device 100 has a plurality of pixel regions 10 which are arranged to form a matrix pattern. As shown in FIG. 9, each of those pixel regions 10 is subjected to alignment division in the same way as the pixel region 10 shown in FIG. 3(c). That is to say, the pixel region 10 includes four liquid crystal domains A to D, which define their tilt directions in approximately 225, 315, 45 and 135 degree directions, respectively, when a voltage is applied between the pixel electrode 11 and the counter electrode 21. One of the two polarizers 13 and 23 has a transmission axis that is substantially parallel to the horizontal direction on the display screen, while the other polarizer has a transmission axis that is substantially parallel to the vertical direction on the display screen. Therefore, the respective tilt directions of the liquid crystal domains A to D define an angle of approximately 45 degrees with respect to the transmission axes of the polarizers 13 and 23.

In FIG. 9, in each of the regions corresponding to the liquid crystal domains A to D, the pretilt direction of the first alignment film 12 is indicated by the dotted arrow, and the pretilt direction of the second alignment film 22 is indicated by the solid arrow. These arrows indicating the pretilt directions show that the liquid crystal molecules pretilt so that their arrowhead end becomes more distant from the substrate (i.e., the substrate provided with the alignment film) than their arrow-tail end is. Look at the regions corresponding to the liquid crystal domains A through D, and it can be seen that the pretilt directions of the first and second alignment films 12 and 22 are different from each other by approximately 90 degrees. As described above, the pretilt angles defined by the first and second alignment films 12 and 22 are suitably substantially equal to each other.

In the liquid crystal display device 100 of this embodiment, the TFT substrate 1 has a plurality of ribs (projecting structures) 14 which are arranged in respective regions corresponding to the edge portions EG1 to EG4 as shown in FIGS. 9 and 10. Each of those ribs 14 is arranged under an associated pixel electrode 11 (i.e., between the pixel electrode 11 and the transparent substrate 1a).

As shown in FIG. 10, each rib 14 typically has two side surfaces 14a and 14b which are inclined toward the surface of the substrate 1a and a peak portion (ridge) 14c which is defined between these side surfaces 14a and 14b, and runs substantially parallel to its associated edge portion. In the following description, the side surface 14a which is located relatively inside will be sometimes referred to herein as an "inner side surface", and the side surface 14b which is located relatively outside will be sometimes referred to herein as an "outer side surface". In this embodiment, each rib 14 is arranged so that its peak portion 14c is located inside of its associated edge portion and that its associated edge portion overlaps with the outer side surface 14b.

As already described with reference to FIG. 1, in the alignment division structure such as that of this pixel region 10, the tilt direction of the liquid crystal domain A defines an angle greater than 90 degrees (e.g., approximately 135 degrees in this embodiment) with respect to the azimuthal direction (e.g., the direction e1 shown in FIG. 1) that is perpendicular to the edge portion EG1 and that points toward the inside of the pixel electrode 11. The tilt direction of the liquid crystal domain B defines an angle greater than 90 degrees (e.g., approximately 135 degrees in this embodiment) with respect to the azimuthal direction (e.g., the direction e2 shown in FIG. 1) that is perpendicular to the edge portion EG2 and that points toward the inside of the pixel electrode 11. The tilt direction of the liquid crystal domain C defines an angle greater than 90 degrees (e.g., approximately 135 degrees in this embodiment) with respect to the azimuthal direction (e.g., the direction e3 shown in FIG. 1) that is perpendicular to the edge portion EG3 and that points toward the inside of the pixel electrode 11. And the tilt direction of the liquid crystal domain D defines an angle greater than degrees (e.g., approximately 135 degrees in this embodiment) with respect to the azimuthal direction (e.g., the direction e4 shown in FIG. 1) that is perpendicular to the edge portion EG4 and that points toward the inside of the pixel electrode 11. That is why dark lines should be produced in the vicinity of these edge portions EG1 to EG4 unless any countermeasure was taken.

Also, the azimuthal component of the alignment controlling force produced by an oblique electric field in the vicinity of the edge portion EG1 (e.g., the direction e1 in FIG. 1) and the azimuthal component of the alignment controlling force produced by the second alignment film 22 in a region corresponding to the liquid crystal domain A have mutually opposite directions. It should be noted that the azimuthal component of the alignment controlling force produced by the second alignment film 22 is indicated by an arrow pointing to the opposite direction from the pretilt direction of the second alignment film 22 that is indicated by the solid arrow in FIG. 9. On the other hand, the azimuthal component of the alignment controlling force produced by the first alignment film 12 is indicated by an arrow pointing to the same direction as the pretilt direction of the first alignment film 12 that is indicated by the dotted arrow in FIG. 9. Thus, it can be said that if an azimuthal direction that is perpendicular to an edge portion and that points toward the inside of the pixel electrode 11 and the pretilt direction of the second alignment film 22 are the same direction, the azimuthal component of the alignment controlling force produced by an oblique electric field and the azimuthal component of the alignment controlling force produced by the second alignment film 22 have mutually opposite directions. As in the vicinity of the edge portion EG1, the azimuthal component of the alignment controlling force produced by an oblique electric field in the vicinity of the edge portion EG3 (e.g., the direction e3 in FIG. 1) and the azimuthal component of the alignment controlling force produced by the second alignment film 22 in a region corresponding to the liquid crystal domain C also have mutually opposite directions. That is why the first type of dark lines should be produced in the vicinity of these edge portions EG1 and EG3 unless any countermeasure was taken.

Also, the azimuthal component of the alignment controlling force produced by an oblique electric field in the vicinity of the edge portion EG2 (e.g., the direction e2 in FIG. 1) and the azimuthal component of the alignment controlling force produced by the first alignment film 12 in a region corresponding to the liquid crystal domain B have mutually opposite directions. As in the vicinity of the edge portion EG2, the azimuthal component of the alignment controlling force produced by an oblique electric field in the vicinity of the edge portion EG4 (e.g., the direction e4 in FIG. 1) and the azimuthal component of the alignment controlling force produced by the first alignment film 12 in a region corresponding to the liquid crystal domain D also have mutually opposite directions. That is why the second type of dark lines should be produced in the vicinity of these edge portions EG2 and EG4 unless any countermeasure was taken.

In the liquid crystal display device 100 of this embodiment, the TFT substrate 1 includes a rib 14 which is arranged in a region where dark lines should be produced and under the pixel electrode 11. By providing such a rib 14, the dark lines can be thinned and driven out as will be described later. As a result, the decrease in transmittance can be minimized. In addition, in the liquid crystal display device 100 of this embodiment, the rib 14 is arranged on the TFT substrate 1, not on the CF substrate 2, and therefore, no particularly high alignment accuracy is required when the TFT substrate 1 and the CF substrate 2 are bonded together. For that reason, the yield does not decrease.

Hereinafter, it will be described, while referring to conventional and comparative liquid crystal display devices, why the liquid crystal display device 100 of this embodiment can achieve the effects described above.

Figure 11:
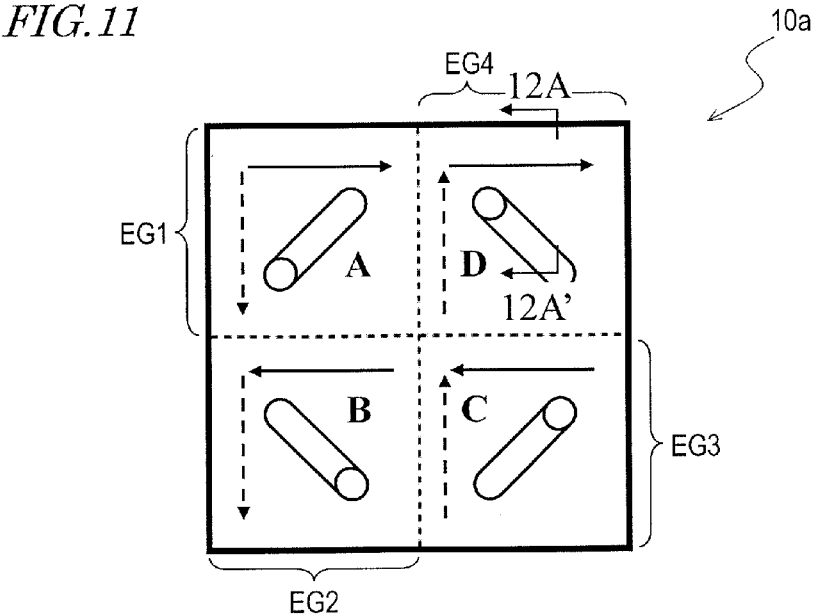
FIG. 11 A plan view schematically illustrating a single pixel region of a conventional liquid crystal display device 600 with no ribs.
Figure 12:
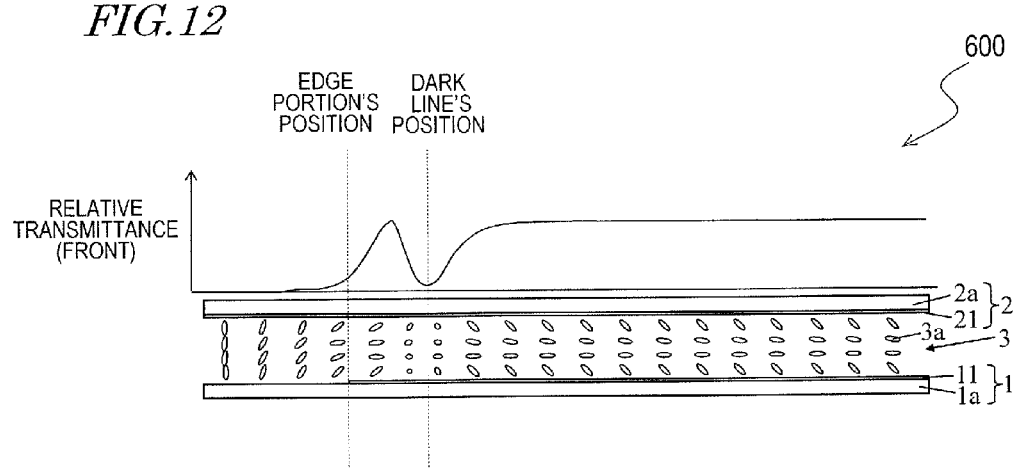
FIG. 12 A cross-sectional view schematically illustrating the conventional liquid crystal display device 600 as viewed on the plane 12A-12A' shown in FIG. 11.

FIGS. 11 and 12 illustrate a conventional liquid crystal display device 600 which does include a vertical alignment liquid crystal layer, of which the pretilt directions are defined by using alignment films, but which has no ribs. FIG. 11 is a plan view schematically illustrating a single pixel region 10a of the liquid crystal display device 600, and FIG. 12 is a cross-sectional view of the device as viewed on the plane 12A-12A' shown in FIG. 11. In FIG. 12, also shown are the orientations of liquid crystal molecules 3a when a voltage corresponding to a grayscale tone is applied to its liquid crystal layer 3 and the relative (front) transmittance. In FIG. 12, illustration of alignment films and polarizers is omitted.

Just like the pixel region 10 shown in FIG. 3(c), the pixel region 10a of this liquid crystal display device 600 is also subjected to alignment division as shown in FIG. 11. That is to say, this pixel region 10a includes four liquid crystal domains A to D, of which the tilt directions are approximately 225, 315, 45 and 135 degree directions, respectively, when a voltage is applied to between the pixel electrode 11 and the counter electrode 21.

In this liquid crystal display device 600, neither the TFT substrate 1 nor the counter substrate 2 has ribs to be arranged in regions corresponding to the edge portions EG1 to EG4 as shown in FIGS. 11 and 12. In this conventional liquid crystal display device 600, in each of its liquid crystal domains A to D, the direction in which the liquid crystal molecules 3a fall under an oblique electric field generated in the vicinity of an edge portion and the pretilt direction defined by an alignment film (which is one of the first and second alignment films on the TFT and CF substrates 1 and 2) are opposite to each other. That is why in the center portion of each liquid crystal domain and a portion in the vicinity of an associated edge portion, the liquid crystal molecules 3a have different orientation directions and dark lines are produced between those portions.

Figure 13:
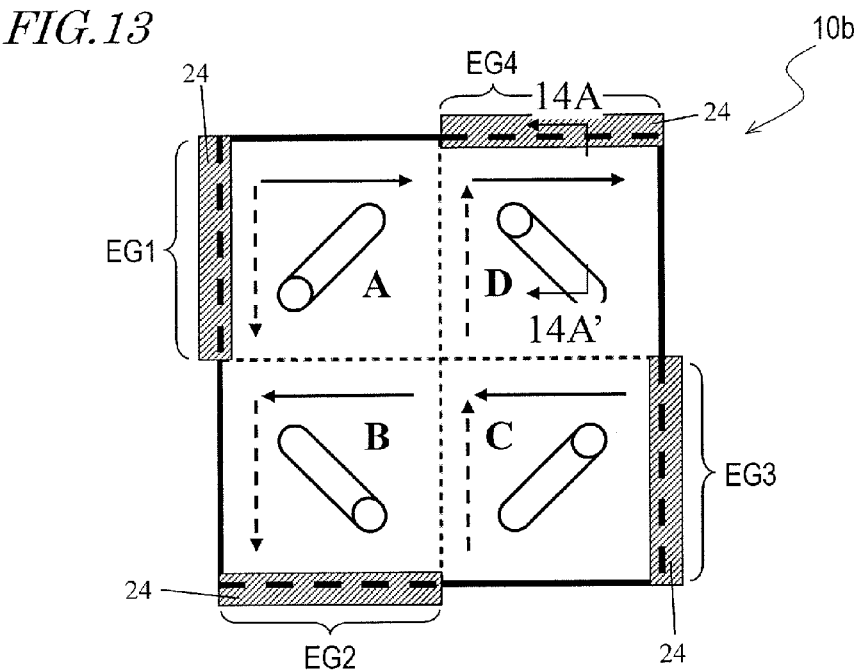
FIG. 13 A plan view schematically illustrating a single pixel region of the liquid crystal display device 700 disclosed in Patent Document No. 2.
Figure 14:
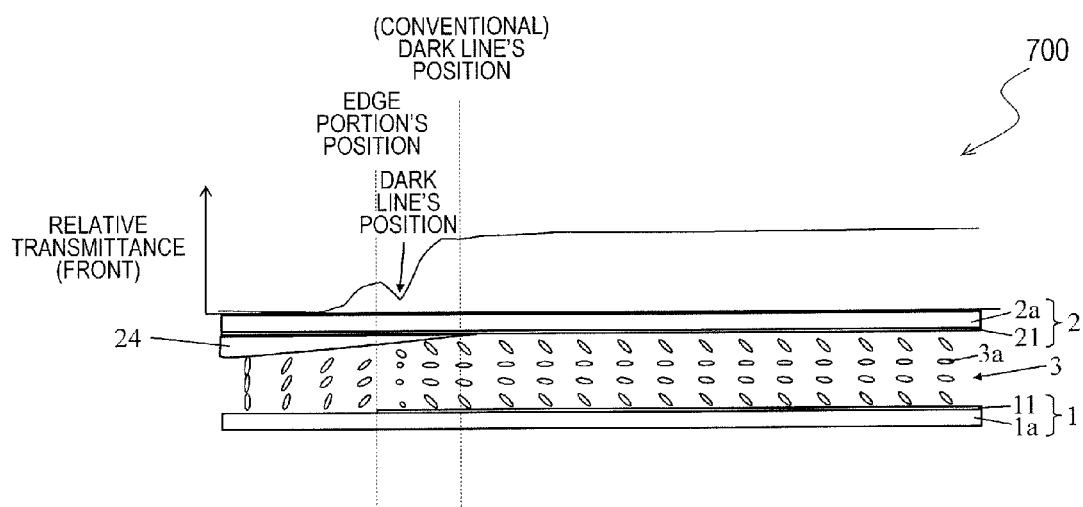
FIG. 14 A cross-sectional view schematically illustrating the liquid crystal display device 700 disclosed in Patent Document No. 2 as viewed on the plane 14A-14A' shown in FIG. 13.

FIGS. 13 and 14 illustrate a liquid crystal display device 700 as disclosed in Patent Document No. 2. FIG. 13 is a plan view schematically illustrating a single pixel region 10b of the liquid crystal display device 700, and FIG. 14 is a cross-sectional view of the device as viewed on the plane 14A-14A' shown in FIG. 13.

Just like the pixel region 10 shown in FIG. 3(c), the pixel region 10b of this liquid crystal display device 700 is also subjected to alignment division as shown in FIG. 13. That is to say, this pixel region 10b includes four liquid crystal domains A to D, of which the tilt directions are approximately 225, 315, 45 and 135 degree directions, respectively, when a voltage is applied to between the pixel electrode 11 and the counter electrode 21.

In the liquid crystal display device 700, the counter substrate 2 has a plurality of ribs 24 which are arranged in regions corresponding to the edge portions EG1 to EG4 as shown in FIGS. 13 and 14. Those ribs 24 are arranged on the counter electrode 21. In this liquid crystal display device 700, the side surface (more exactly, the inner side surface) of each of those ribs 24 functions so as to cancel the effect of an oblique electric field generated in the vicinity of its associated edge portion. That is why as shown in FIG. 14, a portion with a local minimum value of a relative transmittance curve has moved outward compared to the case shown in FIG. 12 (the position of the dark line in the conventional liquid crystal display device 600 is shown in FIG. 14 for your reference), and the portion with decreased relative transmittance has a narrower width. As can be seen, in this liquid crystal display device 700, the dark lines have been driven outward and have become thinner. As a result, the transmittance can be increased and the display quality can be improved.

However, as described above, to check the decrease in transmittance sufficiently using a structure such as the liquid crystal display device 700 disclosed in Patent Document No. 2, the edge portions of the pixel electrodes 11 need to be aligned accurately with the ribs 24. That is why in bonding the TFT substrate 1 and the CF substrate 2 together, high alignment accuracy is required. But to ensure such high alignment accuracy in bonding those substrates together, the yield will decrease instead. In addition, to check the decrease in transmittance sufficiently, the height and width of the ribs 24 should be controlled accurately, too.

The problem of a decrease in yield itself can be overcome by providing ribs on the same substrate as the pixel electrodes, i.e., on the TFT substrate. However, the decrease in transmittance due to production of those dark lines cannot be checked just by providing such ribs for the TFT substrate.

Figure 15:
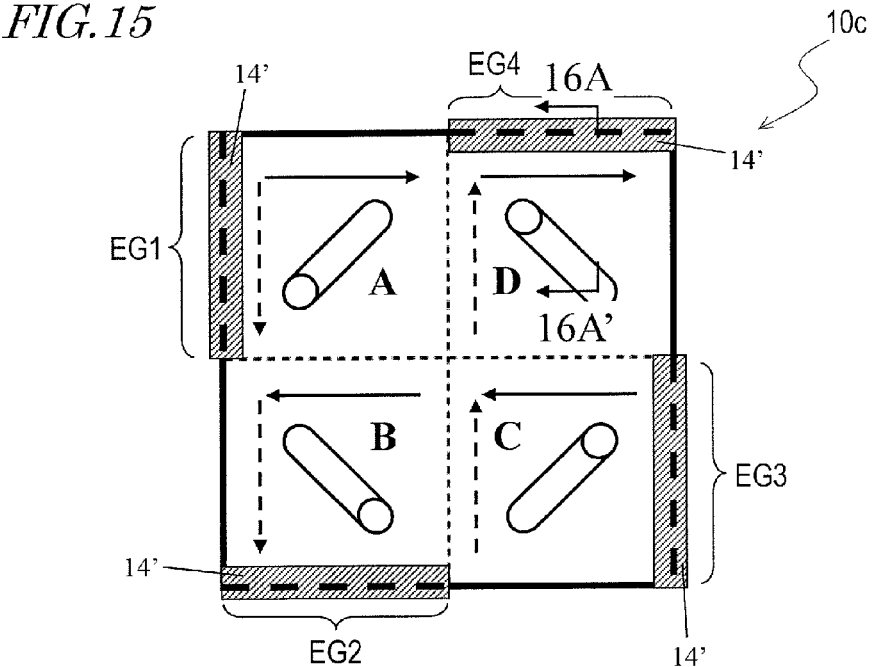
FIG. 15 A plan view schematically illustrating a single pixel region of a liquid crystal display device 800 as a comparative example in which ribs are simply provided for its TFT substrate.
Figure 16:
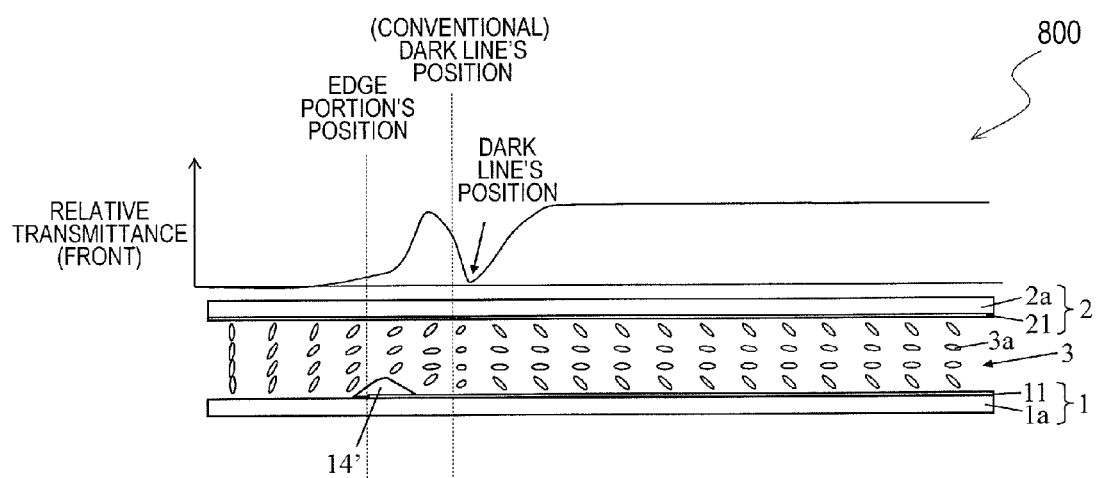
FIG. 16 A cross-sectional view schematically illustrating the liquid crystal display device 800 as the comparative example as viewed on the plane 16A-16A' shown in FIG. 15.

FIGS. 15 and 16 illustrate a liquid crystal display device 800 as a comparative example in which a rib 14' is simply provided on the TFT substrate 1. FIG. 15 is a plan view schematically illustrating a single pixel region 10c of the liquid crystal display device 800, and FIG. 16 is a cross-sectional view of the device as viewed on the plane 16A-16A' shown in FIG. 15.

Just like the pixel region 10 shown in FIG. 3(c), the pixel region 10c of this liquid crystal display device 800 is also subjected to alignment division as shown in FIG. 15. That is to say, this pixel region 10c includes four liquid crystal domains A to D, of which the tilt directions are approximately 225, 315, 45 and 135 degree directions, respectively, when a voltage is applied to between the pixel electrode 11 and the counter electrode 21.

In this liquid crystal display device 800, the TFT substrate 1 has a plurality of ribs 14' which are arranged in regions corresponding to the edge portions EG1 to EG4 as shown in FIGS. 15 and 16. However, those ribs 14' are arranged on the pixel electrodes 11, not under the pixel electrodes 11.

The orientation directions of liquid crystal molecules 3a which are located in the vicinity of the side surface (more exactly, the inner side surface) of the ribs 14' provided on the pixel electrodes 11 agree with those of liquid crystal molecules 3a which fall under the oblique electric field that has been generated in the vicinity of the edge portions. As a result, the alignment controlling force which is applied in the opposite direction to the one applied to the liquid crystal molecules 3a in the center portion of each liquid crystal domain is gained in the vicinity of the edge portions. Consequently, a portion with a local minimum value of a relative transmittance curve has shifted further inward compared to the case shown in FIG. 12 (the position of the dark line in the conventional liquid crystal display device 600 is shown in FIG. 16 for your reference). That is to say, the dark lines will reach even deeper inside the pixel region 10c. Consequently, in the liquid crystal display device 800 in which those ribs 14' are simply provided on the TFT substrate 1, the transmittance will decrease at least as significantly as in the conventional liquid crystal display device 600.

Figure 17:
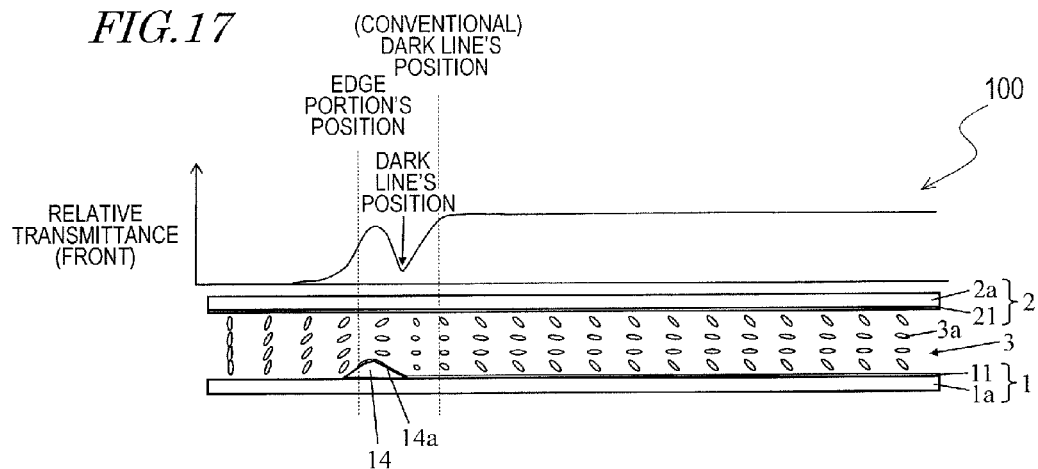
FIG. 17 A cross-sectional view schematically illustrating the liquid crystal display device 100 according to a preferred embodiment of the present invention as viewed on the plane 17A-17A' shown in FIG. 9.

FIG. 17 shows the orientation directions of liquid crystal molecules 3a and the relative (front) transmittance when a voltage corresponding to a grayscale tone is applied to the liquid crystal layer 3 of the liquid crystal display device 100 of this embodiment. FIG. 17 is a cross-sectional view as viewed on the plane 17A-17A' shown in FIG. 9. In FIG. 17, illustration of the first and second alignment films 12 and 22 and polarizers 13 and 23 is omitted.

If the ribs 14 are arranged under the pixel electrodes 11 as in the liquid crystal display device 100 of this embodiment, then electric lines of force, which start from a portion of the pixel electrodes 11 which is on the inner side surface 14a of the ribs 14, will go along a normal to the inner side surface 14a and then travel toward the counter electrode 21. That is why those electric lines of force will curve toward the inside of the pixel region 10. As a result, the liquid crystal molecules 3a (with negative dielectric anisotropy) in the vicinity of the inner side surface 14a of the ribs 14 will fall toward the outer periphery of the pixel region 10 (i.e., in the same direction as the pretilt direction that is defined by one of the first and second alignment films 12 and 22). Meanwhile, electric lines of force which start from the end of the pixel electrode 11 will travel toward the counter electrode 21 while curving toward the outer periphery of the pixel electrode 10. In this manner, those two groups of electric lines of force will curve in two very opposite directions in the vicinity of the inner side surface 14a of the ribs 14 and in the vicinity of the edge portions of the pixel electrode 11. Thus, the effect of the alignment controlling force of the oblique electric field generated in the vicinity of the edge portions on the orientations of the liquid crystal molecules 3a diminishes. Consequently, as shown in FIG. 17, a portion with a local minimum value of a relative transmittance curve has shifted outward compared to the case shown in FIG. 12 (the position of the dark line in the conventional liquid crystal display device 600 is shown in FIG. 17 for your reference), and the portion with decreased relative transmittance has a narrower width. As can be seen, in the liquid crystal display device 700 of this embodiment, the dark lines have been driven outward and have had their width decreased. As a result, the transmittance can be increased and the display quality can be improved.

In addition, in the liquid crystal display device 100 of this embodiment, the ribs 14 are arranged on the TFT substrate 1, not on the CF substrate 2, and therefore, no particularly high alignment accuracy is required in bonding the TFT substrate 1 and the CF substrate 2 together. Consequently, the yield will not decrease.

Figure 18:
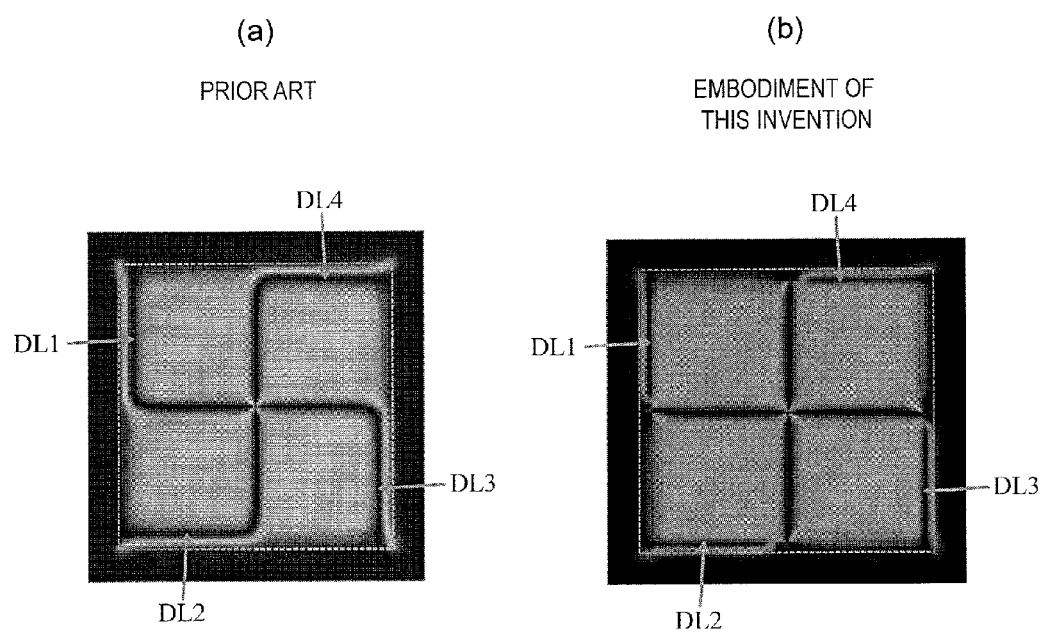
FIGS. 18 (a) and (b) show respective simulation results of the transmittances in a voltage applied state of the pixel region of the conventional liquid crystal display device 600 and the pixel region of the liquid crystal display device 100 according to a preferred embodiment of the present invention.
Figure 19:
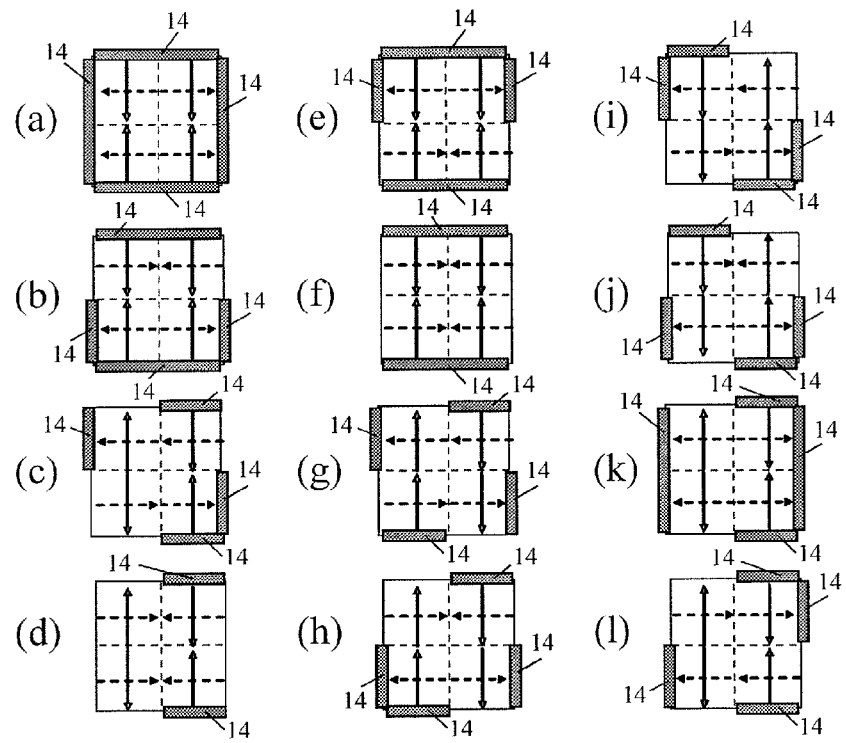
FIG. 19 (a) through (l) illustrate exemplary division patterns which can be used in a situation where a single pixel region is divided into four liquid crystal domains that are arranged in two columns and two rows to form a matrix pattern.
Figure 20:
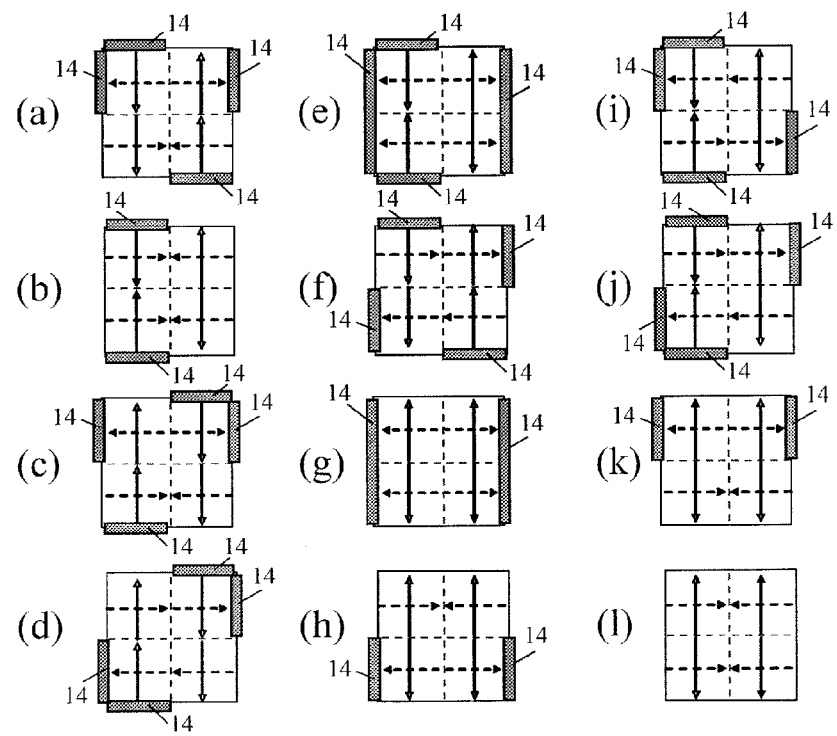
FIG. 20 (a) through (l) illustrate exemplary division patterns which can be used in a situation where a single pixel region is divided into four liquid crystal domains that are arranged in two columns and two rows to form a matrix pattern.
Figure 21:
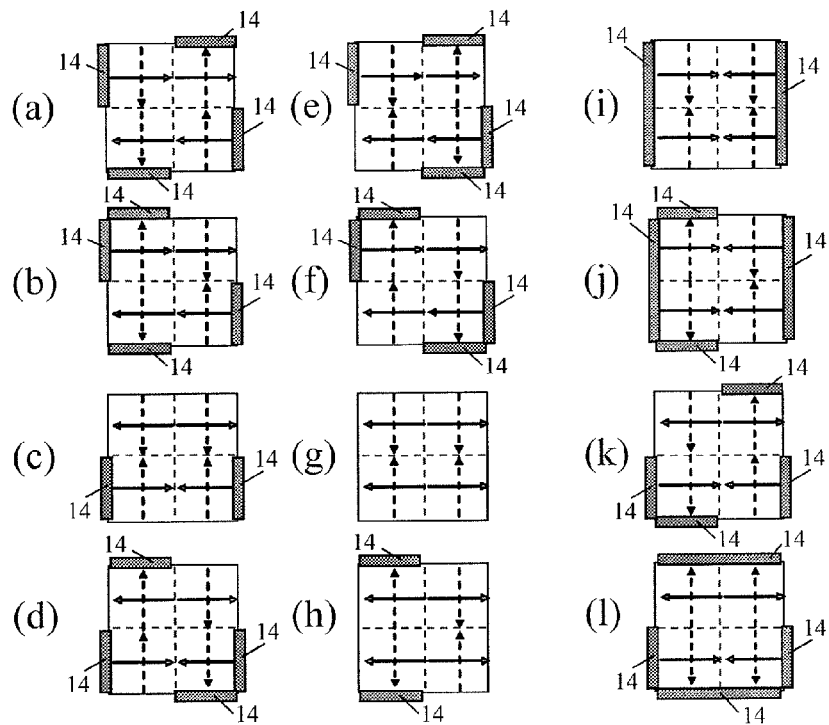
FIG. 21 (a) through (l) illustrate exemplary division patterns which can be used in a situation where a single pixel region is divided into four liquid crystal domains that are arranged in two columns and two rows to form a matrix pattern.
Figure 22:
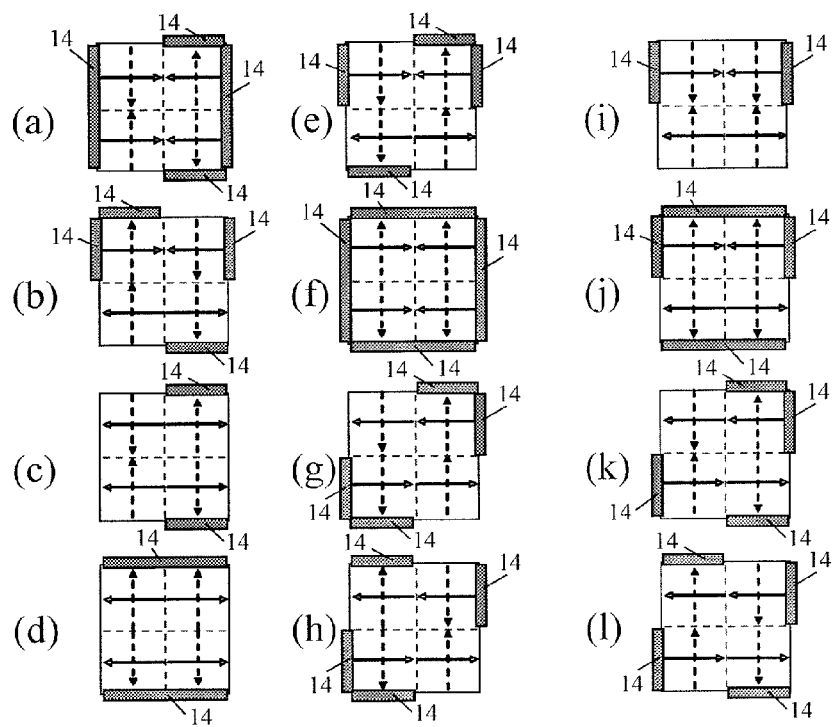
FIG. 22 (a) through (l) illustrate exemplary division patterns which can be used in a situation where a single pixel region is divided into four liquid crystal domains that are arranged in two columns and two rows to form a matrix pattern.

FIG. 18(a) shows a simulation result of the transmittance in a voltage applied state of the pixel region 10a of the conventional liquid crystal display device 600 with no ribs. On the other hand, FIG. 18(b) shows a simulation result of the transmittance in a voltage applied state of the pixel region 10 of the liquid crystal display device 100 of this embodiment. In this case, the pixel regions 10a and 10 both have a square shape with a length of 70 μm×a width of 70 μm. The ribs 14 provided for the liquid crystal display device 100 have a width of 3 μm and a height of 0.8 μm. Two-thirds (i.e., a portion with a width of 2 μm) of each of those ribs 14 overlaps with the pixel electrode 11 and the other one-third of the rib 14 (i.e., a portion with a width of 1 μm) is located outside of the pixel electrode 11.

Comparing the results shown in FIGS. 18(a) and 18(b) to each other, it can be seen that in the liquid crystal display device 100 of this embodiment, the dark lines DL1, DL2, DL3 and DL4 have shifted toward the outer periphery of the pixel region 10 and have become thinner than their counterparts of the conventional liquid crystal display device 600. According to the simulation result shown in this example, the transmittance of the pixel region 10 of the liquid crystal display device 100 of this embodiment was 1.04 times as high as that of the pixel region 10a of the conventional liquid crystal display device 600.

As can be seen from the foregoing description, the liquid crystal display device 100 of this embodiment can check the decrease in transmittance due to generation of dark lines substantially without causing a decrease in yield.

It should be noted that to reduce sufficiently the effect of the alignment controlling force of the oblique electric field generated in the vicinity of the edge portions of the pixel electrodes 11 on the orientations of the liquid crystal molecules 3a, a half or more of the ribs 14 suitably overlaps with the pixel electrodes 11 as shown in FIGS. 10 and 17. That is to say, at least the inner side surface 14a of the ribs 14 is suitably covered with the pixel electrodes 11. However, the ribs 14 should not be covered entirely with the pixel electrodes 11. The reason is that as the outer side surface 14b of the ribs 14 causes the liquid crystal molecules 3a to fall in the same direction as the oblique electric field generated in the vicinity of the edge portions of the pixel electrodes 11, i.e., fall toward the inside of the pixel region 10, if the ribs 14 were entirely covered with the pixel electrodes 11, the effect of increasing the transmittance would diminish.

The width and height of the ribs 14 are not particularly limited. Typically, the ribs 14 have a width of 2 μm to 10 μm and a height of 0.4 μm to 1.3 μm. The material of the ribs 14 is not particularly limited, either. For example, the ribs 14 may be made of a photosensitive resin.

The alignment division does not always have to be performed on the pixel regions in the pattern described above. If a single pixel region needs to be divided into four liquid crystal domains which need to be arranged in two columns and two rows to form a matrix pattern, then there will be 48 division patterns as shown in FIGS. 19(a) through 22(l). In these drawings, in each of the regions corresponding to the respective liquid crystal domains, the pretilt direction of the first alignment film 12 is indicated by the dotted arrow, and the pretilt direction of the second alignment film 22 is indicated by the solid arrow as in FIG. 9. As for division patterns involving dark lines, ribs 14 to be provided to eliminate those dark lines are also shown.

As shown in FIGS. 19(a) through 22(l), the number and positions of regions to have dark lines vary according to the division pattern. Specifically, according to the division patterns shown in FIGS. 19(a), 19(b), 19(e), 19(f), 19 (g) and 19 (k), FIGS. 20 (e), 20 (f) and 20(g), FIGS. 21(a), 21(i), 21(j) and 21(l), and FIGS. 22(a), 22(d), 22(f), 22(j) and 22(l), dark lines are produced in all of the four liquid crystal domains and ribs 14 are arranged in all of the four liquid crystal domains. On the other hand, according to the division patterns shown in FIGS. 19(c), 19(h), 19(j) and 19(l), FIGS. 20(a), 20(c), 20(i) and 20(j), FIGS. 21(b), 21(d), 21(e) and 21(k), and FIGS. 22 (b), 22(e), 22 (h) and 22(k), dark lines are produced in three of the four liquid crystal domains and ribs 14 are arranged in those three liquid crystal domains.

Furthermore, according to the division patterns shown in FIGS. 19(d) and 19(i), FIGS. 20(b), 20(d), 20(h) and 20(k), FIGS. 21 (c), 21(f), and 21(h), and FIGS. 22(c), 22(g), and 22(i), dark lines are produced in two of the four liquid crystal domains and ribs 14 are arranged in those two liquid crystal domains. But according to the division patterns shown in FIGS. 20(l) and 21(g), no dark lines are produced, and therefore, no ribs 14 are provided at all.

If a photo-alignment treatment is carried out as the alignment treatment, only some of the 48 division patterns shown in FIGS. 19(a) through 22(l) are suitably used as will be described in detail below.

To form an alignment division structure through a photo-alignment treatment, a photo-alignment film needs to be subjected to separate exposures using a photomask. In this case, the photomask to be used has striped opaque portions.

Figure 23:
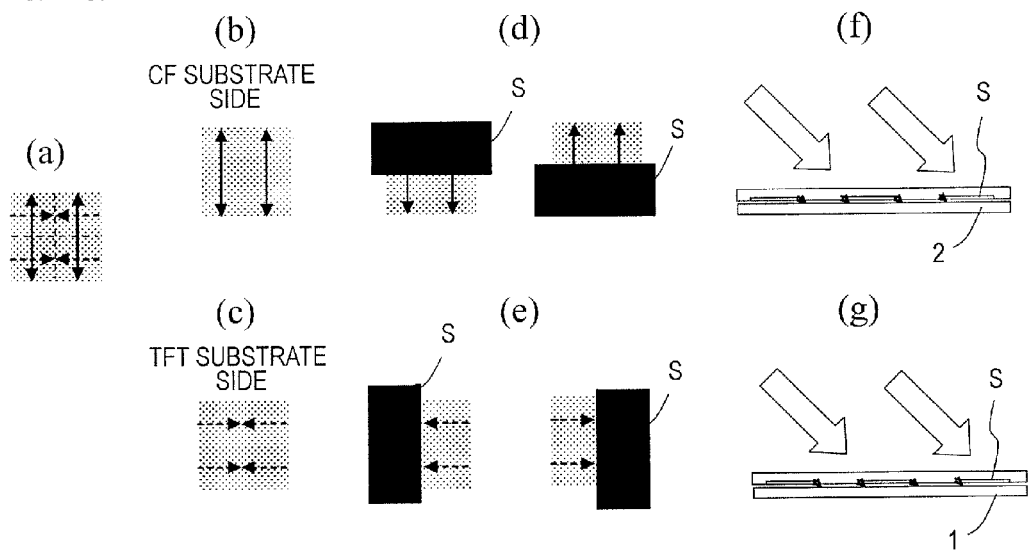
FIG. 23 (a) through (g) illustrate a light radiating method to obtain a division pattern.

For example, to obtain the division pattern shown in FIG. 23(a) (which is the same as the division pattern shown in FIG. 20(l)), the second alignment film 22 on the CF substrate 2 needs to be given the pretilt direction shown in FIG. 23(b), and the first alignment film 12 on the TFT substrate 1 needs to be given the pretilt direction shown in FIG. 23(c). For that purpose, the CF substrate 2 is subjected to separate exposures with the opaque portions S of a photomask arranged as shown in FIG. 23(d), and the TFT substrate 1 is subjected to separate exposures with the opaque portions S of a photomask arranged as shown in FIG. 23(e). In this case, as shown in FIGS. 23(f) and 23(g), light is radiated from a direction which tilts with respect to a direction that intersects at right angles with the direction in which the opaque portions S run. More specifically, the CF substrate 2 is irradiated with light that has come from a direction that tilts with respect to the vertical direction (i.e., column direction) with the opaque portions S arranged to run horizontally (i.e., in the row direction). On the other hand, the TFT substrate 1 is irradiated with light that has come from a direction that tilts with respect to the horizontal direction with the opaque portions S arranged to run vertically.

Figure 24:
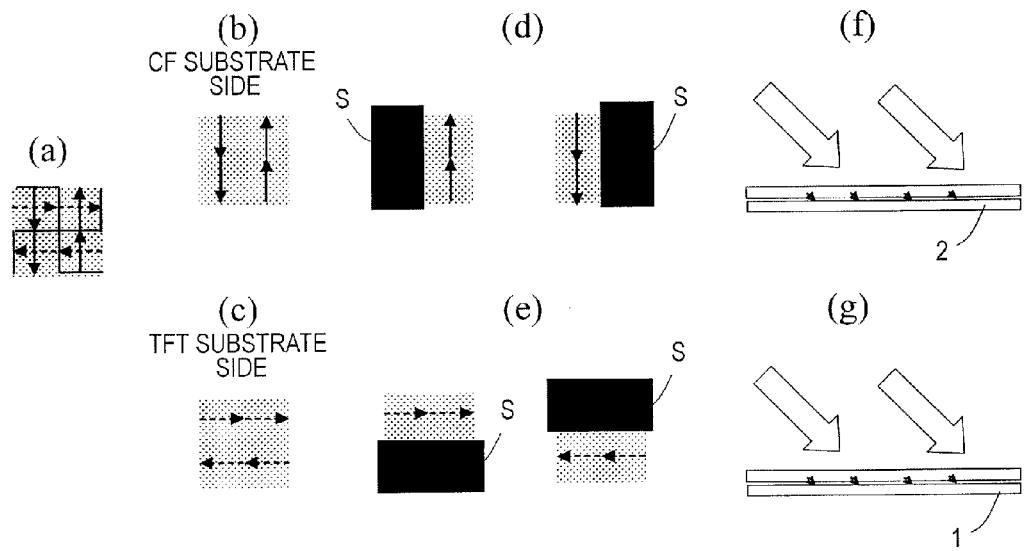
FIG. 24 (a) through (g) illustrate a light radiating method to obtain a division pattern.
Figure 25:
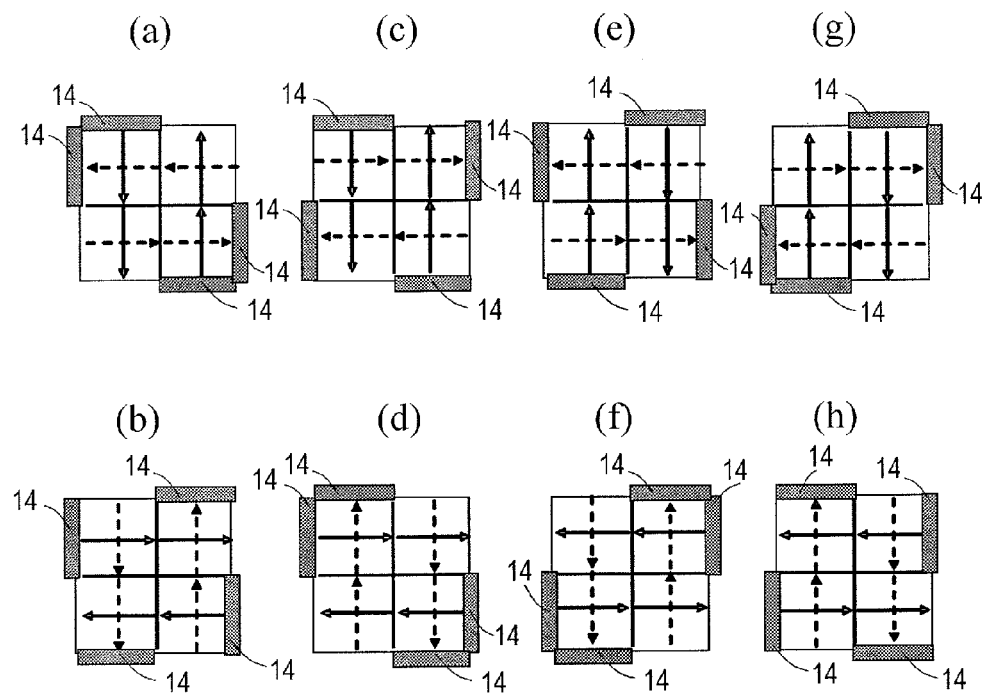
FIG. 25 (a) through (h) illustrate exemplary preferred division patterns.

On the other hand, to obtain the division pattern shown in FIG. 24(a) (which is the same as the division pattern shown in FIG. 20(f)), the second alignment film 22 on the CF substrate 2 needs to be given the pretilt direction shown in FIG. 24(b), and the first alignment film 12 on the TFT substrate 1 needs to be given the pretilt direction shown in FIG. 24(c). For that purpose, the CF substrate 2 is subjected to separate exposures with the opaque portions S of a photomask arranged as shown in FIG. 24(d), and the TFT substrate 1 is subjected to separate exposures with the opaque portions S of a photomask arranged as shown in FIG. 24(e). In this case, as shown in FIGS. 24(f) and 24(g), light is radiated from a direction which tilts with respect to a direction that is parallel to the direction in which the opaque portions S run. More specifically, the CF substrate 2 is irradiated with light that has come from a direction that tilts with respect to the vertical direction with the opaque portions S arranged to run vertically. On the other hand, the TFT substrate 1 is irradiated with light that has come from a direction that tilts with respect to the horizontal direction with the opaque portions S arranged to run horizontally.

As can be seen, the relation between the direction in which the opaque portions S of a photomask run and the light radiating direction changes according to the division pattern. Thus, light may be radiated from either a direction which tilts with respect to a direction that intersects at right angles with the direction in which the opaque portions S run (such a method will be referred to herein as "Radiating Method A" for convenience sake) or a direction which tilts with respect to a direction that is parallel to the direction in which the opaque portions S run (such a method will be referred to herein as "Radiating Method B" for convenience sake).

In this case, if Radiating Method A is adopted, then the exposed portion could shift from the targeted area or that targeted area could not be exposed sufficiently due to the presence of a very narrow gap between the photomask and the substrate or due to diffraction. For that reason, the division patterns to be realized by only Radiating Method B are suitably adopted.

Specifically, the division patterns to be realized by only Radiating Method B may be the eight patterns shown in FIGS. 25(a) through 25(h). According to the division patterns shown in FIGS. 25 (b), 25 (c), 25 (e), and 25(h), dark lines may be produced in all of the four liquid crystal domains and ribs 14 are arranged in all of the four liquid crystal domains. On the other hand, according to the division patterns shown in FIGS. 25(a), 25(d), 25(f) and 25(g), dark lines may be produced in two of the four liquid crystal domains and ribs 14 are arranged in those two liquid crystal domains.

Figure 26:
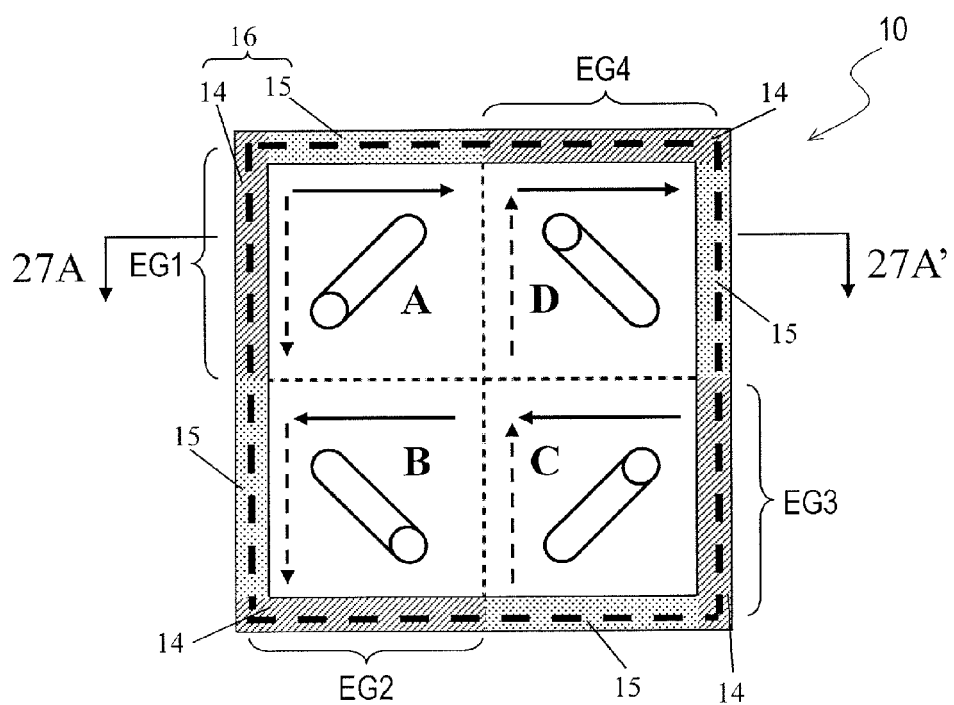
FIG. 26 A plan view schematically illustrating a single pixel region of a liquid crystal display device 200 as a preferred embodiment of the present invention.
Figure 27:
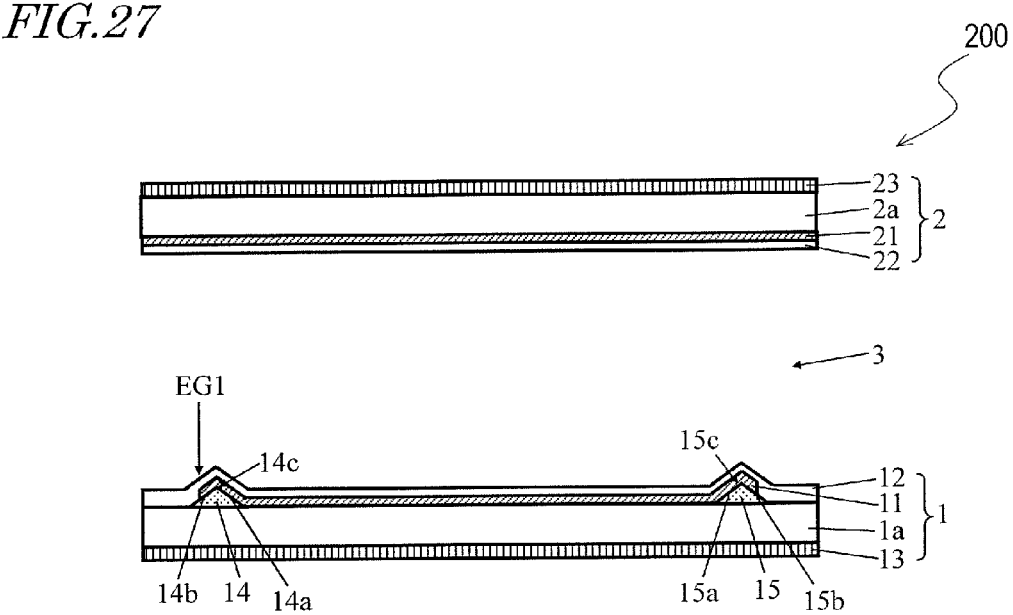
FIG. 27 A cross-sectional view schematically illustrating the liquid crystal display device 200 according to the preferred embodiment of the present invention as viewed on the plane 27A-27A' shown in FIG. 26.

In the examples described above, the ribs 14 are supposed to be arranged only in the regions where dark lines are produced. Optionally, however, additional ribs may also be arranged in regions where no dark lines are produced. A liquid crystal display device 200 with such additional ribs is illustrated in FIGS. 26 and 27. FIG. 26 is a plan view schematically illustrating a single pixel region 10 of the liquid crystal display device 200. FIG. 27 is a cross-sectional view as viewed on the plane 27A-27A' shown in FIG. 26.

In the liquid crystal display device 200, the TFT substrate 1 includes not only a plurality of ribs 14 which are arranged in regions corresponding to the edge portions EG1 to EG4 but also multiple additional ribs 15 which are arranged in regions corresponding to portions of the edges of the pixel electrode 11 other than the edge portions EG1 through EG4 as shown in FIGS. 26 and 27. Just like the ribs 14, those additional ribs 15 are also arranged under the pixel electrodes 11 (i.e., between the pixel electrodes 11 and the transparent substrate 1a).

The ribs 14 and the additional ribs 15 are arranged continuously, and therefore, form a rib structure 16 which surrounds the pixel region 10. In other words, the ribs 14 and the additional ribs 15 are included in the rib structure 16. The rib structure 16 is arranged in the regions corresponding to all edges of the pixel electrode 11 and under the pixel electrode 11.

As shown in FIG. 27, each of those additional ribs typically has two side surfaces (inner and outer side surfaces) 15a and 15b which are inclined toward the surface of the substrate 1a and a peak portion (ridge) 15c which is defined between these side surfaces 15a and 15b, and runs substantially parallel to its associated edge portion. In this embodiment, each additional rib 15 is arranged so that its peak portion 15c is located inside of its associated edge portion and that its associated edge of the pixel electrode 11 overlaps with the outer side surface 15b.

If such a rib structure is arranged for every edge of the pixel electrodes 11 as in this liquid crystal display device 200, the transmittance can be further increased for the following reasons.

The tilt directions of the liquid crystal domains A through D define an angle of approximately 45 degrees with respect to the edges of the pixel electrode 11. On the other hand, the oblique electric field generated in the vicinity of edges of the pixel electrode 11 has such an alignment controlling force as to cause the liquid crystal molecules 3a to fall perpendicularly to the edges of the pixel electrode 11. That is why around those edges of the pixel electrode 11, the orientation directions of the liquid crystal molecules 3a have shifted from the intended azimuthal direction even in a region where no dark lines are produced. For that reason, even if no dark lines are recognized there, the transmittance has decreased anyway.

However, if the rib structure 16 is provided (i.e., additional ribs 15 are provided) as in this liquid crystal display device 200, those additional ribs 15 can weaken the effect of the oblique electric field. As a result, the orientation directions of the liquid crystal molecules 3a in the vicinity of the edges of the pixel electrode 11 can be brought closer to the intended (original) azimuthal direction, and therefore, the transmittance can be further increased.

Figure 28:
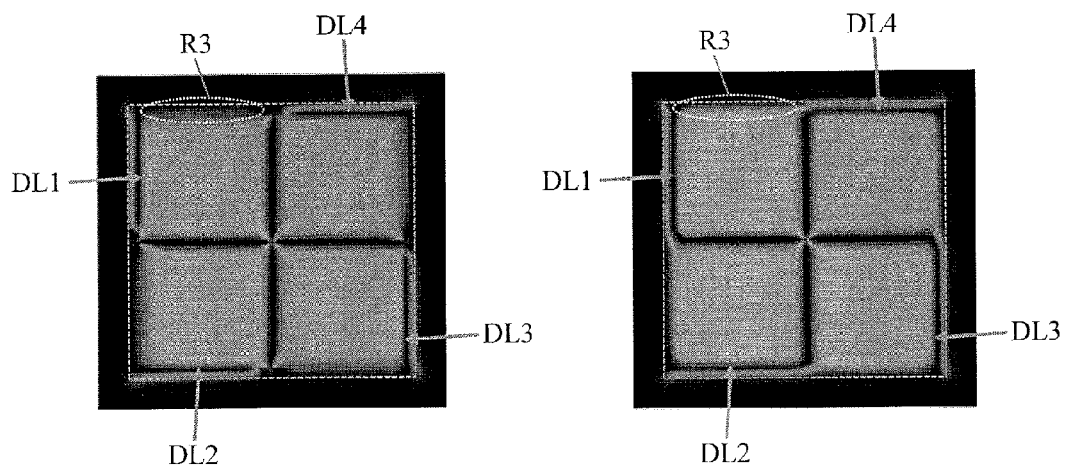
FIGS. 28 (a) and (b) show respective simulation results of the transmittances in a voltage applied state of the pixel regions of the liquid crystal display devices 100 and 200 according to preferred embodiments of the present invention.

FIG. 28(a) shows a simulation result of the transmittance in a voltage applied state of the pixel region 10 of the liquid crystal display device 100 that has the ribs 14 provided for the edge portions EG1 to EG4 but that has no additional ribs 15. On the other hand, FIG. 28(b) shows a simulation result of the transmittance in a voltage applied state of the pixel region 10 of the liquid crystal display device 200 having not only the ribs 14 provided for the edge portions EG1 to EG4 but also the additional ribs 15. In this case, the pixel regions 10 of the liquid crystal display devices 100 and 200 both have a square shape with a length of 70 μm×a width of 70 μm. The ribs 14 and the additional ribs 15 have a width of 3 μm and a height of 0.8 μm. Two-thirds (i.e., a portion with a width of 2 μm) of each of those ribs 14 and additional ribs 15 overlaps with the pixel electrode 11 and the other one-third of the ribs 14 and additional ribs 15 (i.e., a portion with a width of 1 μm) is located outside of the pixel electrode 11.

As shown in FIGS. 28(a) and 28(b), it can be seen that in both of the liquid crystal display devices 100 and 200, the dark lines DL1, DL2, DL3 and DL4 have shifted toward the outer periphery of the pixel region 10 and have become thinner than their counterparts of the conventional liquid crystal display device 600 (see FIG. 18(a)). Also, if the regions in the vicinity of the edges of the pixel electrode where no dark lines DL1, DL2, DL3 and DL4 have been produced are compared to each other between the devices shown in FIGS. 28(a) and 28(b) (e.g., if their regions R3 indicated by the dotted ellipse in FIGS. 28(a) and 28(b) are compared to each other), it can be seen that the liquid crystal display device 200 looks somewhat brighter than the liquid crystal display device 100. According to the simulation result shown in this example, the transmittance of the pixel region 10 of the liquid crystal display device 100 was 1.04 times as high as that of the pixel region 10a of the conventional liquid crystal display device 600. On the other hand, the transmittance of the pixel region 10 of the liquid crystal display device 200 was 1.09 times as high as that of the pixel region 10a of the conventional liquid crystal display device 600. As can be seen from these results, the liquid crystal display device 200 can further increase the transmittance.

INDUSTRIAL APPLICABILITY

According to an embodiment of the present invention, it is possible to prevent the transmittance from decreasing due to generation of dark lines in a VA mode liquid crystal display device, of which the alignment division structure is formed of an alignment film, substantially without decreasing the production yield. A liquid crystal display device according to the present invention can be used effectively in a TV receiver or in any other application that requires high display quality.

REFERENCE SIGNS LIST

1 TFT substrate (active-matrix substrate)
1a, 2a transparent substrate
2 CF substrate (counter substrate)
3 liquid crystal layer
3a liquid crystal molecule
10, 20, 30, 40 pixel region
11 pixel electrode
12 first alignment film
13, 23 polarizer
14 rib
14a rib's (inner) side surface
14b rib's (outer) side surface
14c rib's peak portion (ridge)
15 additional rib
15a additional rib's (inner) side surface
15b additional rib's (outer) side surface
15c additional rib's peak portion (ridge)
16 rib structure
21 counter electrode
22 second alignment film
100 liquid crystal display device
SD1 to SD4 pixel electrode's edge
EG1 to EG4 pixel electrode's edge portion
A to D liquid crystal domain
t1 to t4 tilt direction (reference alignment direction)
e1 to e4 azimuthal direction that is perpendicular to pixel electrode's edge and that points toward inside of the pixel electrode
DL1 to DL4 dark line

The invention claimed is:

1. A liquid crystal display device comprising a plurality of pixel regions which are arranged to form a matrix pattern, the device further comprising:
 a vertical alignment liquid crystal layer;
 first and second substrates which face each other with the liquid crystal layer interposed between themselves;
 a pixel electrode which is arranged in each of the pixel regions on one side of the first substrate that fronts on the liquid crystal layer;
 a counter electrode which is arranged on one side of the second substrate that fronts on the liquid crystal layer and which faces the pixel electrodes; and
 first and second alignment films which are arranged between the pixel electrodes and the liquid crystal layer and between the counter electrode and the liquid crystal layer, respectively,
 wherein each of the plurality of pixel regions includes first, second, third and fourth liquid crystal domains in which liquid crystal molecules are tilted in first, second, third and fourth predetermined directions, respectively, around the center of a plane, and approximately at the middle of the thickness, of the liquid crystal layer in response to a voltage applied between the pixel electrode and the counter electrode, the first, second, third and fourth directions being four directions that are defined so that an angle formed between any two of the four directions is approximately equal to an integral multiple of 90 degrees,
 the first liquid crystal domain is located close to at least a part of edges of the pixel electrode, the part including a first edge portion in which an azimuthal direction that is perpendicular to the part and that points toward the inside of the pixel electrode defines an angle greater than 90 degrees with respect to the first direction, and
 the first substrate includes a first rib which is arranged in a region corresponding to the first edge portion and under the pixel electrode.

2. The liquid crystal display device of claim 1, wherein the azimuthal component of an alignment controlling force produced by an oblique electric field that has been generated in the vicinity of the first edge portion and the azimuthal component of an alignment controlling force produced by the first or second alignment film have mutually opposite directions.

3. The liquid crystal display device of claim 1, wherein a half or more of the first rib overlaps with the pixel electrode.

4. The liquid crystal display device of claim 1, wherein the second liquid crystal domain is located close to at least a part of edges of the pixel electrode, the at least part including a second edge portion in which an azimuthal direction that is perpendicular to the part and that points toward the inside of the pixel electrode defines an angle greater than 90 degrees with respect to the second direction,
 the third liquid crystal domain is located close to at least a part of edges of the pixel electrode, the at least part including a third edge portion in which an azimuthal direction that is perpendicular to the part and that points toward the inside of the pixel electrode defines an angle greater than 90 degrees with respect to the third direction,
 the fourth liquid crystal domain is located close to at least a part of edges of the pixel electrode, the at least part including a fourth edge portion in which an azimuthal direction that is perpendicular to the part and that points toward the inside of the pixel electrode defines an angle greater than 90 degrees with respect to the fourth direction, and
 the first substrate further includes:
 a second rib which is arranged in a region corresponding to the second edge portion and under the pixel electrode;
 a third rib which is arranged in a region corresponding to the third edge portion and under the pixel electrode; and
 a fourth rib which is arranged in a region corresponding to the fourth edge portion and under the pixel electrode.

5. The liquid crystal display device of claim 4, wherein the first substrate further includes a rib structure which is arranged in a region corresponding to every edge of the pixel electrode and which is arranged under the pixel electrode, and the rib structure includes the first, second, third and fourth ribs.

6. The liquid crystal display device of claim 1, wherein the first, second, third and fourth liquid crystal domains are arranged in two columns and two rows to form a matrix pattern so that each of these liquid crystal domains is adjacent to the other liquid crystal domains.

7. The liquid crystal display device of claim 6, wherein the first, second, third and fourth liquid crystal domains are arranged so that their tilt directions are different from each other by approximately 90 degrees between any two adjacent ones of the liquid crystal domains.

8. The liquid crystal display device of claim 7, wherein if a horizontal direction on a display plane has an azimuth angle of 0 degrees, the first direction is about 45 degrees, about 135 degrees, about 225 degrees or about 315 degrees.

9. The liquid crystal display device of claim 1, wherein the azimuthal direction that is perpendicular to the first edge portion and that points toward the inside of the pixel electrode defines an angle of approximately 135 degrees with respect to the first direction.

10. The liquid crystal display device of claim 1, further comprising a pair of polarizers which face each other with the liquid crystal layer interposed between themselves and which are arranged so that their transmission axes intersect with each other at substantially right angles, wherein the first, second, third and fourth directions define an angle of approximately 45 degrees with respect to the transmission axes of the pair of polarizers.

11. The liquid crystal display device of claim 1, wherein the liquid crystal layer has liquid crystal molecules with negative dielectric anisotropy, and
the pretilt directions defined by the first and second alignment films are different from each other by approximately 90 degrees.

12. The liquid crystal display device of claim 1, wherein the pretilt angles defined by the first and second alignment films are substantially equal to each other.

13. The liquid crystal display device of claim 1, wherein each of the first and second alignment films is a photo-alignment film.

14. The liquid crystal display device of claim 3, wherein only a part of the first rib is covered with the pixel electrode.

* * * * *